United States Patent [19]
Toda

[11] Patent Number: 5,994,817
[45] Date of Patent: Nov. 30, 1999

[54] ULTRASONIC TOUCH-POSITION SENSING DEVICE

[76] Inventor: Kohji Toda, 1-49-18 Futaba, Yokosuka, Japan, 239

[21] Appl. No.: 09/023,194

[22] Filed: Feb. 13, 1998

[51] Int. Cl.⁶ .................................................. H01L 41/08
[52] U.S. Cl. .................................. 310/313 R; 310/313 D
[58] Field of Search ........................... 310/313 R, 313 B, 310/313 C, 313 D; 333/151–155, 193–196

[56] References Cited

U.S. PATENT DOCUMENTS

| | | | |
|---|---|---|---|
| 5,679,998 | 10/1997 | Toda | 310/313 R |
| 5,723,934 | 3/1998 | Toda | 310/313 R |
| 5,767,604 | 6/1998 | Toda | 310/313 R |
| 5,767,608 | 6/1998 | Toda | 310/313 R |
| 5,771,206 | 6/1998 | Toda | 310/313 R |
| 5,838,088 | 11/1998 | Toda | 310/313 R |
| 5,850,118 | 12/1998 | Toda | 310/313 R |
| 5,886,452 | 3/1999 | Toda | 310/313 R |

Primary Examiner—Mark O. Budd

[57] ABSTRACT

An ultrasonic touch-position sensing device comprises a piezoelectric substrate, two ultrasonic transducing units formed on an upper end surface of the piezoelectric substrate, and a signal controller connected with the ultrasonic transducing units. Each ultrasonic transducing unit consists of at least an input interdigital transducer and at least an output interdigital transducer. The output interdigital transducer has at least a finger-overlap zone $R_i$ (i=1). The finger-overlap zone $R_i$ comprises zones $R_{ia}$, $R_{ib}$ and $R_{im}$. The finger direction of the zones $R_{ia}$ and $R_{ib}$ runs parallel with that of the input interdigital transducer. The finger direction of the zone $R_{im}$ is slanting to that of the input interdigital transducer. When an electric signal is applied to the input interdigital transducer, an ultrasound is excited in the piezoelectric substrate, and transduced to electric signals $E_{ia}$ and $E_{ib}$ (i=1, 2, . . . , N) at the zones $R_{ia}$ and $R_{ib}$, respectively. The input- and output interdigital transducers form N pairs of ultrasound propagation lanes $Z_{ia}$ and $Z_{ib}$ (i=1, 2, . . . , N), in the piezoelectric substrate, corresponding to the zones $R_{ia}$ and $R_{ib}$, as well as to positions $F_{ia}$ and $F_{ib}$ (i=1, 2, . . . , N) on the upper- or a lower end surface of the piezoelectric substrate, respectively.

16 Claims, 17 Drawing Sheets signal controller 5,994,817

ULTRASONIC TOUCH-POSITION SENSING DEVICE

BACKGROUND OF THE INVENTION

1. Field of the Invention

The present invention relates to an ultrasonic device for sensing a touch-position on an upper- or a lower end surface of a piezoelectric substrate having two ultrasonic transducing units thereon.

2. Description of the Prior Art

An ultrasonic form of conventional touch panels has a nonpiezoelectric plate under acoustic vibration, which is decreased or disappeared when touching on the nonpiezoelectric plate. Conventional methods for exciting an acoustic vibration on a nonpiezoelectric plate generally include a wedge-shaped transducer with a bulk wave vibrator for vibrating a nonpiezoelectric plate indirectly, or a piezoelectric thin film transducer for vibrating a nonpiezoelectric plate directly. The wedge-shaped transducer is mainly used for a non-destructive evaluation by ultrasound under a comparative low frequency operation alone because of the difficulty on manufacturing accuracy of the wedge angle and so on. The piezoelectric thin film transducer consists of a nonpiezoelectric plate, a piezoelectric thin film mounted on the nonpiezoelectric plate and made from ZnO and others, and interdigital transducers exciting the acoustic vibration on the nonpiezoelectric plate. Because of various transmission characteristics of the interdigital transducers with various structures, the piezoelectric thin film transducer is used as a high frequency device, however has operation frequencies limited to the UHF and VHF bands, and has some problems on manufacturing and mass production. In addition, conventional-type transducers make use of decreasing or disappearance of output electric signal in accordance with decreasing or disappearance of an acoustic wave on the nonpiezoelectric plate by touching thereon, causing a high voltage operation with a high power consumption, and a large-scale circuit with a complicated structure.

Thus, it is difficult for conventional touch panels to realize a quick response-time, a low voltage operation and a low power consumption, and a small-sized circuit with a simple structure. Moreover, there are some problems on manufacturing, mass production and operation frequencies.

SUMMARY OF THE INVENTION

An object of the present invention is to provide an ultrasonic touch-position sensing device capable of specifying a touch-position on an upper- or a lower end surface of a piezoelectric substrate with a high sensitivity and a quick response time.

Another object of the present invention is to provide an ultrasonic touch-position sensing device excellent in manufacturing and mass-production.

A still other object of the present invention is to provide an ultrasonic touch-position sensing device operating under low power consumption with low voltage.

A still further object of the present invention is to provide an ultrasonic touch-position sensing device having a small-sized circuit with a simple structure which is very light in weight.

According to one aspect of the present invention there is provided an ultrasonic touch-position sensing device comprising a piezoelectric substrate having an upper- and a lower end surfaces running perpendicular to the direction of the thickness d thereof, two ultrasonic transducing units, and a signal controller connected with the ultrasonic transducing units. Each ultrasonic transducing unit consists of at least an input interdigital transducer formed on the upper end surface of the piezoelectric substrate, and at least an output interdigital transducer opposed to the input interdigital transducer and placed on the upper end surface of the piezoelectric substrate. The input interdigital transducer has an interdigital periodicity P and an overlap length L. The output interdigital transducer has a finger-overlap zone $R_i$ (i=1), or has N finger-overlap zones $R_i$ (i=1, 2, . . . , N) and N−1 finger-overlap zones $Q_i$ {i=1, 2, . . . , (N−1)} between two finger-overlap zones $R_i$ and $R_{(i+1)}$. Each finger-overlap zone $R_i$ comprises a first zone $R_{ia}$, a second zone $R_{ib}$, and a third zone $R_{im}$ between the zones $R_{ia}$ and $R_{ib}$. The finger direction of the zones $R_{ia}$ and $R_{ib}$ runs parallel with that of the input interdigital transducer. An interdigital periodicity of the zones $R_{ia}$ and $R_{ib}$ is equal to the interdigital periodicity P. The finger direction of the zone $R_{im}$ is slanting to that of the input interdigital transducer by an angle α. An interdigital periodicity $P_{RN}$ along the vertical direction to the finger direction of the zone $R_{im}$ is equal to the product of the interdigital periodicity P and cos α, The zone $R_{im}$ has a first overlap length $L_{RP}$ along the finger direction thereof and a second overlap length $L_{RN}$ along the finger direction of the input interdigital transducer. The overlap length $L_{RP}$ is equal to the product of the overlap length $L_{RN}$ and sec α as well as the product of half the interdigital periodicity P and cosec α. The finger direction of the finger-overlap zone $Q_i$ is slanting to that of the input interdigital transducer by an angle ±β. An interdigital periodicity $P_{QN}$ along the vertical direction to the finger direction of the finger-overlap zone $Q_i$ is equal to the product of the interdigital periodicity P and cos β. The finger-overlap zone $Q_i$ has a first overlap length $L_{QP}$ along the finger direction thereof and a second overlap length $L_{QN}$ along the finger direction of the input interdigital transducer. The overlap length $L_{QP}$ is equal to the product of the overlap length $L_{QN}$ and sec β. The overlap length $L_{QP}$ is also equal to the product of cosec β and the interdigital periodicity P divided by twice the number N of the finger-overlap zones $R_i$. For example, if N=2, the overlap length $L_{QP}$ is not only equal to the product of the overlap length $L_{QN}$ and sec β, but also equal to the product of P/4 and cosec β.

When operating the ultrasonic touch-position sensing device, an electric signal is applied to the input interdigital transducer. In this time, an ultrasound is excited in the piezoelectric substrate, and transduced to electric signals $E_{ia}$ and $E_{ib}$ (i=1, 2, . . . , N), at the zones $R_{ia}$ and $R_{ib}$, respectively. The sum of the electric signals $E_{ia}$ and $E_{ib}$ is zero, because that the overlap length $L_{RP}$ is equal to the product of the overlap length $L_{RN}$ and sec α as well as the product of P/2 and cosec α. The input- and output interdigital transducers form N pairs of ultrasound propagation lanes $Z_{ia}$ and $Z_{ib}$ (i=1, 2, . . . , N), in the piezoelectric substrate, corresponding to the zones $R_{ia}$ and $R_{ib}$, respectively. The ultrasound propagation lanes $Z_{ia}$ and $Z_{ib}$ correspond to positions $F_{ia}$ and $F_{ib}$ (i=1, 2, . . . , N) on the upper- or lower end surface of the piezoelectric substrate, respectively. If touching with a finger or others on a position $F_{xa}$, an ultrasound on an ultrasound propagation lane $Z_{xa}$ attenuates, and an electric signal $E_{xb}$ corresponding to an ultrasound propagation lane $Z_{xb}$ is delivered at the output interdigital transducer. In the same way, if touching on a position $F_{xb}$, an ultrasound on the ultrasound propagation lane $Z_{xb}$ attenuates, and an electric signal $E_{xa}$ corresponding to the ultrasound propagation lane $Z_{xa}$ is delivered at the output interdigital transducer, the positions $F_{xa}$ and $F_{xb}$ making a pair. The signal controller senses a touch on the position $F_{xa}$ or $F_{xb}$ by detecting the electric signal $E_{xb}$ or $E_{xa}$, respectively. The touched position $F_{xa}$ or $F_{xb}$ with respect to one of the ultrasonic transducing units and that with respect to the other ultrasonic transducing unit are specified at the same time. In addition, the ultrasound propagation lanes $Z_{xa}$ and $Z_{xb}$ of one of the ultrasonic transducing units are vertical to those of the other ultrasonic transducing unit.

According to another aspect of the present invention there is provided an ultrasonic touch-position sensing device including two ultrasonic transducing units. Each ultrasonic transducing unit consists of at least an input interdigital transducer and at least an output interdigital transducer. The input interdigital transducer has N finger-overlap zones $A_i$ (i=1, 2, ..., N) and N−1 finger-overlap zones $B_i$ {i=1, 2, ..., (N−1)} between two finger-overlap zones $A_i$ and $A_{(i+1)}$. The output interdigital transducer has N+1 finger-overlap zones $C_i$ {i=1, 2, ..., (N+1)} and N finger-overlap zones $D_i$ (i=1, 2, ..., N) between two finger-overlap zones $C_i$ and $C_{(i+1)}$. The finger direction of the finger-overlap zones $A_i$ runs parallel with that of the finger-overlap zones $C_i$. The finger direction of the finger-overlap zones $B_i$ is slanting to that of the finger-overlap zones $A_i$ by an angle $-\beta$. An interdigital periodicity $P_{BN}$ along the vertical direction to the finger direction of the finger-overlap zones $B_i$ is equal to the product of $\cos \beta$ and an interdigital periodicity P of the finger-overlap zones $A_i$ and $C_i$. Each finger-overlap zone $B_i$ has a first overlap length $L_{BP}$ along the finger direction thereof and a second overlap length $L_{BN}$ along the finger direction of the finger-overlap zones $A_i$. The overlap length $L_{BP}$ is equal to the product of sec $\beta$ and the overlap length $L_{BN}$. The overlap length $L_{BP}$ is also equal to the product of cosec $\beta$ and the interdigital periodicity P divided by twice the number N of the finger-overlap zones $A_i$. For example, if N=2, the overlap length $L_{BP}$ is not only equal to the product of the overlap length $L_{BN}$ and sec $\beta$, but also equal to the product of P/4 and cosec $\beta$. The finger direction of the finger-overlap zones $D_i$ is slanting to that of the finger-overlap zones $C_i$ by an angle $\alpha$. An interdigital periodicity $P_{DN}$ along the vertical direction to the finger direction of the finger-overlap zones $D_i$ is equal to the product of $\cos \alpha$ and the interdigital periodicity P. Each finger-overlap zone Di has a first overlap length $L_{DP}$ along the finger direction thereof and a second overlap length $L_{DN}$ along the finger direction of the finger-overlap zones $C_i$. The overlap length $L_{DP}$ is equal to the product of sec $\alpha$ and the overlap length $L_{DN}$ as well as the product of half the interdigital periodicity P and cosec $\alpha$, that is the product of P/2 and cosec $\alpha$.

When operating the ultrasonic touch-position sensing device, an electric signal is applied to the input interdigital transducer. In this time, an ultrasound is excited in the piezoelectric substrate, and transduced to N electric signals $E_{ia}$ (i=1, 2, ..., N) and N electric signals $E_{ib}$ (i=1, 2, ..., N), respectively. The sum of the electric signals $E_{ia}$ and $E_{ib}$ is zero, because that the overlap length $L_{DP}$ is equal to the product of sec $\alpha$ and the overlap length $L_{DN}$ as well as the product of P/2 and cosec $\alpha$. The input- and output interdigital transducers form N pairs of ultrasound propagation lanes $Z_{ia}$ and $Z_{ib}$ (i=1, 2, ..., N) in the piezoelectric substrate, an ultrasound propagation lane $Z_{ia}$ existing between the finger-overlap zones $A_i$ and $C_i$, an ultrasound propagation lane $Z_{ib}$ existing between the finger-overlap zones $A_i$ and $C_{(i+1)}$. The ultrasound propagation lanes $Z_{ia}$ and $Z_{ib}$ correspond to positions $F_{ia}$ and $F_{ib}$ (i=1, 2, ..., N) on the upper- or lower end surface of the piezoelectric substrate, respectively. If touching on a position $F_{xa}$, an ultrasound on an ultrasound propagation lane $Z_{xa}$ attenuates, and an electric signal $E_{xb}$ corresponding to an ultrasound propagation lane $Z_{xb}$ is delivered at the output interdigital transducer. In the same way, if touching on a position $F_{xb}$, an ultrasound on the ultrasound propagation lane $Z_{xb}$ attenuates, and an electric signal $E_{xa}$ corresponding to the ultrasound propagation lane $Z_{xa}$ is delivered at the output interdigital transducer, the positions $F_{xa}$ and $F_{xb}$ making a pair. The signal controller senses a touch on the position $F_{xa}$ or $F_{xb}$ by detecting the electric signal $E_{xb}$ or $E_{xa}$, respectively.

According to another aspect of the present invention there are provided two ultrasonic transducing units, each thereof further comprising an amplifier. An output terminal of the output interdigital transducer is connected with an input terminal of the input interdigital transducer and an input terminal of the signal controller, via the amplifier. The electric signal $E_{xb}$ or $E_{xa}$, delivered at the output interdigital transducer when touching on the position $F_{xa}$ or $F_{xb}$, has a frequency $F_{xb}$ or $F_{xa}$, respectively. The signal controller senses a touch on the position $F_{xa}$ by detecting the frequency $F_{xb}$ of the electric signal $E_{xb}$, or a touch on the position $F_{xb}$ by detecting the frequency $F_{xa}$ of the electric signal $E_{xa}$.

According to another aspect of the present invention there are provided two ultrasonic transducing units, each thereof further comprising a reference input interdigital transducer, a reference output interdigital transducer, an amplifier, and a phase comparator. The finger direction of the reference input interdigital transducer is parallel to that of the reference output interdigital transducer. An output terminal of the reference output interdigital transducer is connected not only with an input terminal of the input interdigital transducer and that of the reference input interdigital transducer, but also with an input terminal of the phase comparator, via the amplifier. An output terminal of the output interdigital transducer is connected with an input terminal of the signal controller via the phase comparator. When an electric signal is applied to the reference input interdigital transducer, an ultrasound is excited in the piezoelectric substrate. The ultrasound is transduced to an electric signal with a phase $\theta_{base}$ at the reference output interdigital transducer, and then the electric signal is delivered at the reference output interdigital transducer. On the other hand, the electric signal $E_{xb}$ or $E_{xa}$, delivered at the output interdigital transducer when touching on the position $F_{xa}$ or $F_{xb}$, has a phase $\theta_{xa}$ or $\theta_{xb}$, respectively. The phase comparator detects a difference between the phases $\theta_{base}$ and $\theta_{xa}$, ($\theta_{base}-\theta_{xa}$), or a difference between the phases $\theta_{base}$ and $\theta_{xb}$, ($\theta_{base}-\theta_{xb}$). The signal controller senses a touch on the position $F_{xa}$ by evaluating the phase difference ($\theta_{base}-\theta_{xb}$), or a touch on the position $F_{xb}$ by evaluating the phase difference ($\theta_{base}-\theta_{xa}$).

According to another aspect of the present invention there is provided a condition that the interdigital periodicity P is larger than the thickness d of the piezoelectric substrate. Under this condition, an elastic wave having the wavelength approximately equal to the interdigital periodicity P is excited in the piezoelectric substrate, when an electric signal having a frequency approximately corresponding to the interdigital periodicity P is applied to the input interdigital transducer. Accordingly, an electric signal is delivered at the output interdigital transducer by touching on the upper- or the lower end surface of the piezoelectric substrate.

According to other aspect of the present invention there is provided a condition that the interdigital periodicity P is smaller than one third of the thickness d of the piezoelectric substrate. Under this condition, a surface acoustic wave having the wavelength approximately equal to the interdigital periodicity P is excited on the upper end surface, with the input- and output interdigital transducers, of the piezoelectric substrate, when an electric signal having a frequency approximately corresponding to the interdigital periodicity P is applied to the input interdigital transducer. Accordingly, an electric signal is delivered at the output interdigital transducer by touching on the upper end surface of the piezoelectric substrate.

According to a further aspect of the present invention there is provided a piezoelectric substrate made from piezoelectric ceramic, the polarization axis thereof being parallel to the direction of the thickness d.

BRIEF DESCRIPTION OF THE DRAWINGS

Other features and advantages of the invention will be clarified from the following description with reference to the attached drawings.

DETAILED DESCRIPTION OF THE PRESENTLY PREFERRED EXEMPLARY EMBODIMENTS

Figure 1:
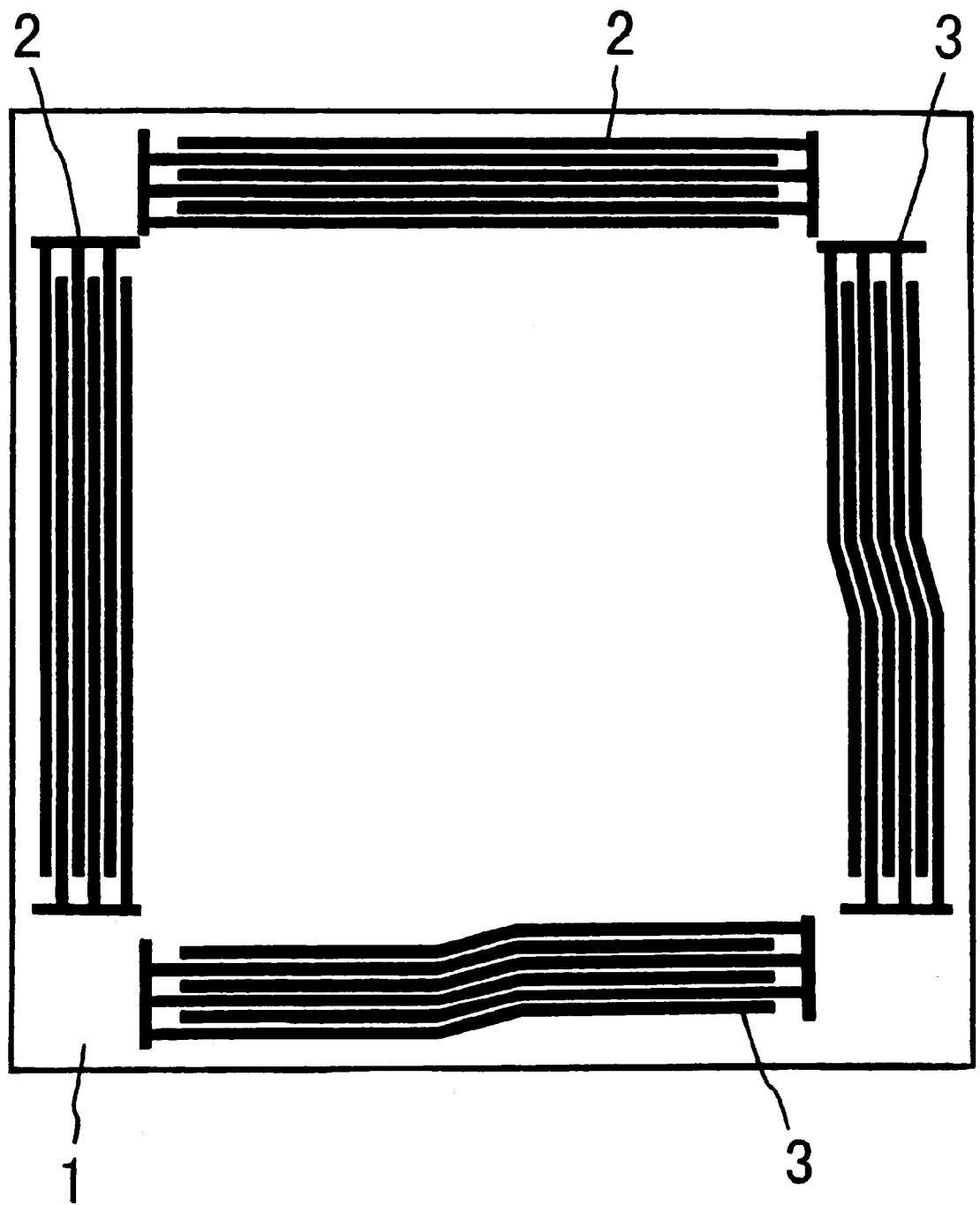
FIG. 1 shows plan view of an ultrasonic touch-position sensing device according to first embodiment of the present invention.

FIG. 1 shows a plan view of an ultrasonic touch-position sensing device according to a first embodiment of the present invention. The ultrasonic touch-position sensing device comprises piezoelectric substrate 1 having an upper- and a lower end surfaces running perpendicular to the direction of the thickness d thereof, ultrasonic transducing units X and Y, and signal controller 5 connected with ultrasonic transducing units X and Y. Each of ultrasonic transducing units X and Y comprises input interdigital transducer 2 made from aluminium thin film and formed on the upper end surface of piezoelectric substrate 1, output interdigital transducer 3 made from aluminium thin film and formed on the upper end surface of piezoelectric substrate 1, and amplifier 4. FIG. 1 shows only piezoelectric substrate 1, input interdigital transducers 2 and output interdigital transducers 3. Output interdigital transducer 3 is opposed to input interdigital transducer 2. Piezoelectric substrate 1 is made from a piezoelectric ceramic with a dimension of 1.5 mm in thickness d. The polarization axis of piezoelectric substrate 1 is parallel to the direction of the thickness d thereof.

Figure 2:
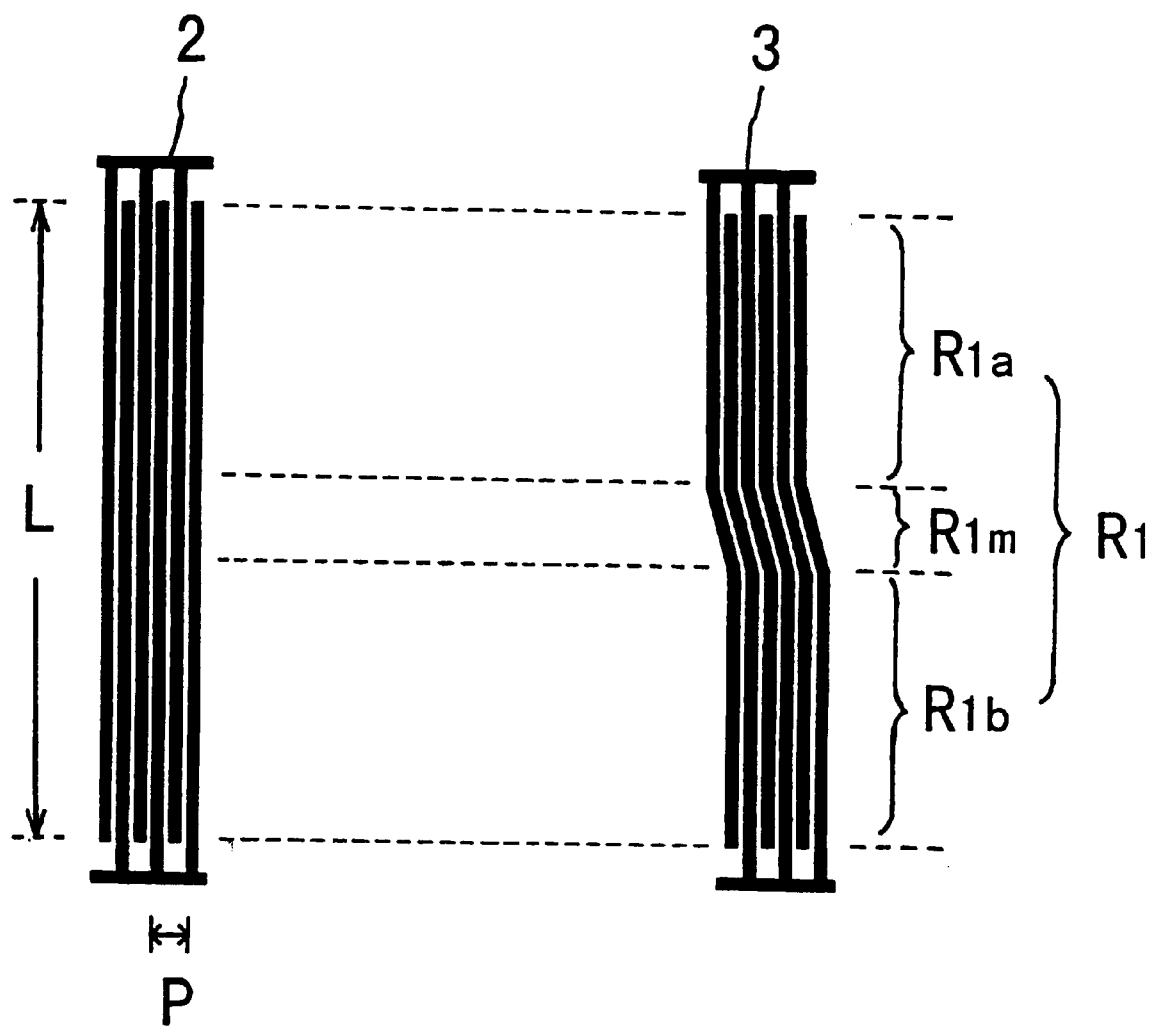
FIG. 2 shows the relative positions of input interdigital transducer 2 and output interdigital transducer 3.

FIG. 2 shows the relative positions of input interdigital transducer 2 and output interdigital transducer 3. Input interdigital transducer 2 having ten finger pairs, has an interdigital periodicity P of 1.7 mm and an overlap length L of 15 mm. Output interdigital transducer 3 with ten finger pairs has finger-overlap zone $R_1$ comprising first zone $R_{1a}$, second zone $R_{1b}$, and third zone $R_{1m}$ between zones $R_{1a}$ and $R_{1b}$. The finger direction of zones $R_{1a}$ and $R_{1b}$ runs parallel with that of input interdigital transducer 2. An interdigital periodicity of zones $R_{1a}$ and $R_{1b}$ is equal to the interdigital periodicity P.

Figure 3:
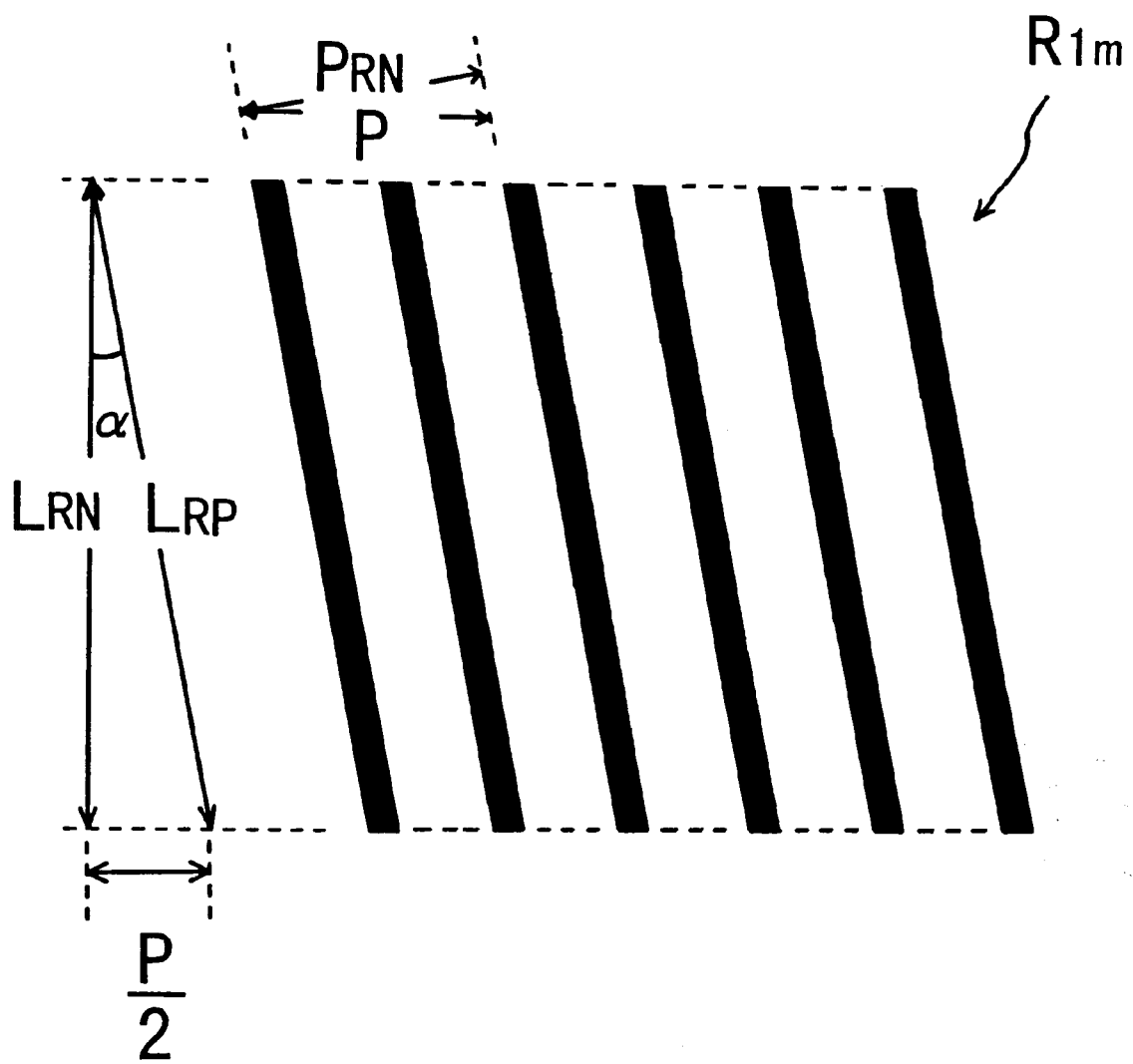
FIG. 3 shows a plan view, on an enlarged scale, of zone $R_{1m}$.

FIG. 3 shows a plan view, on an enlarged scale, of zone $R_{1m}$. The finger direction of zone $R_{1m}$ is slanting to that of input interdigital transducer 2 by an angle α. An interdigital periodicity $P_{RN}$ along the vertical direction to the finger direction of zone $R_{1m}$ is equal to the product of the interdigital periodicity P and cos α. Zone $R_{1m}$ has a first overlap length $L_{RP}$ along the finger direction thereof and a second overlap length $L_{RN}$ along the finger direction of input interdigital transducer 2. The overlap length $L_{RP}$ is equal to the product of the overlap length $L_{RN}$ and sec α as well as the product of half the interdigital periodicity P and cosec α. The sum of the overlap length (7 mm) of zone $R_{1a}$, the overlap length (7 mm) of zone $R_{1b}$ and the overlap length $L_{RN}$ (1 mm) of zone $R_{1m}$ is equal to the overlap length L (15 mm).

Figure 4:
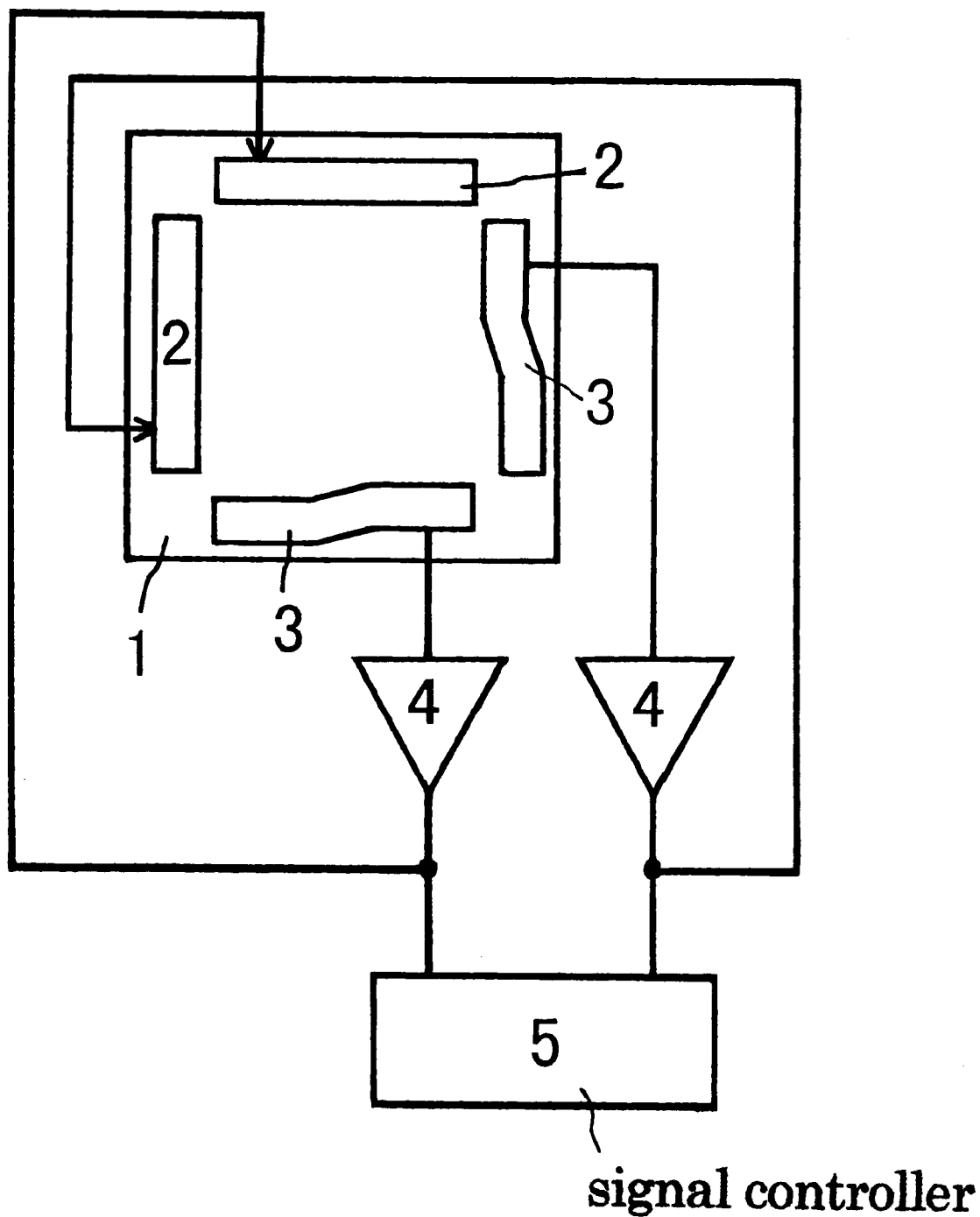
FIG. 4 shows a diagram of a circuit for the ultrasonic touch-position sensing device in FIG. 1.

FIG. 4 shows a diagram of a circuit for the ultrasonic touch-position sensing device in FIG. 1. An output terminal of output interdigital transducer 3 is connected with an input terminal of input interdigital transducer 2 and that of signal controller 5, via amplifier 4. When an electric signal having a frequency approximately corresponding to the interdigital periodicity P is applied to input interdigital transducer 2, an elastic wave having the wavelength approximately equal to the interdigital periodicity P is excited in piezoelectric substrate 1. The elastic wave is transduced to electric signals $E_{1a}$ and $E_{1b}$ at zones $R_{1a}$, and $R_{1b}$, respectively. In this time, the sum of the electric signals $E_{1a}$ and $E_{1b}$ is zero, because that the overlap length $L_{RP}$ is equal to the product of the overlap length $L_{RN}$ and sec α as well as the product of P/2 and cosec α. Input interdigital transducer 2 and output interdigital transducer 3 form two ultrasound propagation lanes $Z_{1a}$ and $Z_{1b}$, corresponding to zones $R_{1a}$ and $R_{1b}$, respectively, in piezoelectric substrate 1, ultrasound propagation lanes $Z_{1a}$ and $Z_{1b}$ making a pair. Ultrasound propagation lanes $Z_{1a}$ and $Z_{1b}$ correspond to positions $F_{1a}$ and $F_{1b}$ on the upper- or lower end surface of piezoelectric substrate 1, respectively. If touching nowhere on the upper-or lower end surface of piezoelectric substrate 1, no electric signal is detected at output interdigital transducer 3. However, if an ultrasound on ultrasound propagation lane $Z_{1a}$ attenuates by touching on position $F_{1a}$, an electric signal $E_{1b}$ having a frequency $f_{1b}$ and corresponding to ultrasound propagation lane $Z_{1b}$ is delivered at output interdigital transducer 3. In the same way, if an ultrasound on ultrasound propagation lane $Z_{1b}$ attenuates by touching on position $F_{1b}$, an electric signal $E_{1a}$ having a frequency $f_{1a}$ and corresponding to ultrasound propagation lane $Z_{1a}$ is delivered at output interdigital transducer 3. Signal controller 5 senses a touch on position $F_{1a}$ by detecting the frequency fib of the electric signal $E_{1b}$, or a touch on position $F_{1b}$ by detecting the frequency $f_{1a}$ of the electric signal $E_{1a}$. The touched position $F_{1a}$ or $F_{1b}$ with respect to ultrasonic transducing unit X and that with respect to ultrasonic transducing unit Y are specified at the same time. In addition, ultrasound propagation lanes $Z_{1a}$ and $Z_{1b}$ of ultrasonic transducing unit X are vertical to those of ultrasonic transducing unit Y.

The electric signal $E_{1a}$ or $E_{1b}$ delivered at output interdigital transducer 3 is amplified via amplifier 4, a part of the amplified electric signal being applied to input interdigital transducer 2 again. Thus, input interdigital transducer 2, output interdigital transducer 3, and amplifier 4 form an oscillator only when touching on position $F_{1a}$ or $F_{1b}$, causing not only a low voltage operation and low power consumption, but also a small-sized circuit with a simple structure. In addition, the ultrasonic touch-position sensing device is not under the influence of the surroundings, such as a change in temperature.

Figure 5:
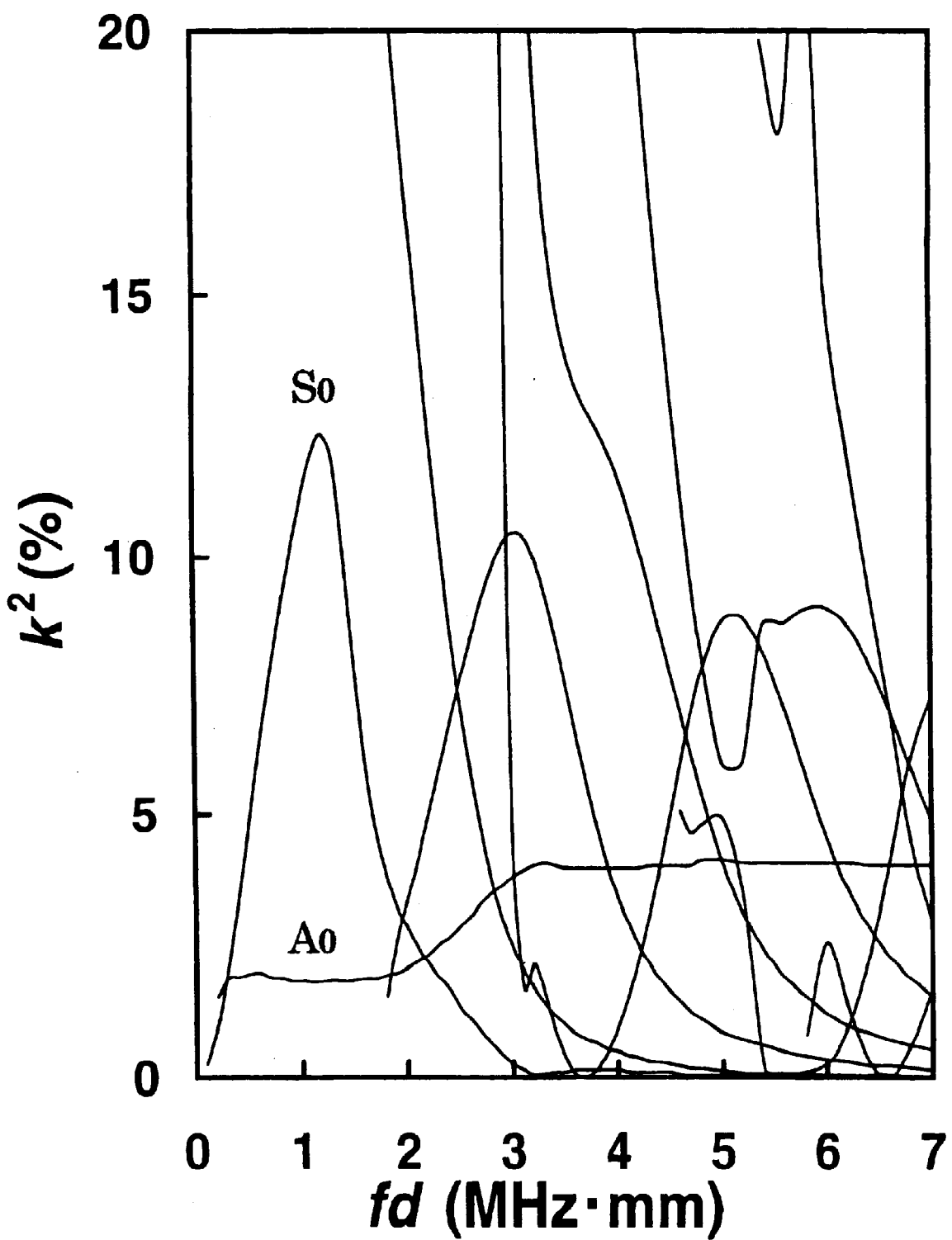
FIG. 5 shows a relationship between the $k^2$ value calculated from the difference between the phase velocity under electrically opened condition and that under electrically shorted condition of piezoelectric substrate 1, and the fd value.

FIG. 5 shows a relationship between the electromechanical coupling constant $k^2$ calculated from the difference between the phase velocity under electrically opened condition and that under electrically shorted condition of piezoelectric substrate 1, and the product fd of the frequency f of the elastic wave and the thickness d of piezoelectric substrate 1. Piezoelectric substrate 1 has a shear wave velocity of 2450 m/s traveling thereon alone, and a longitudinal wave velocity of 4390 m/s traveling thereon alone. For example, an electric energy applied to input interdigital transducer 2 is effectively transduced to the $S_o$ mode elastic wave when the fd value is approximately 1.3 MHz-mm, then the $k^2$ value is approximately 12.4% being the maximum value. It is clear that the $k^2$ value of 12.4% is worthy in comparison that a crystallized $LiNbO_3$ used as a popular piezoelectric substrate for exciting a surface acoustic wave has the $k^2$ value of approximately 5%.

Figure 6:
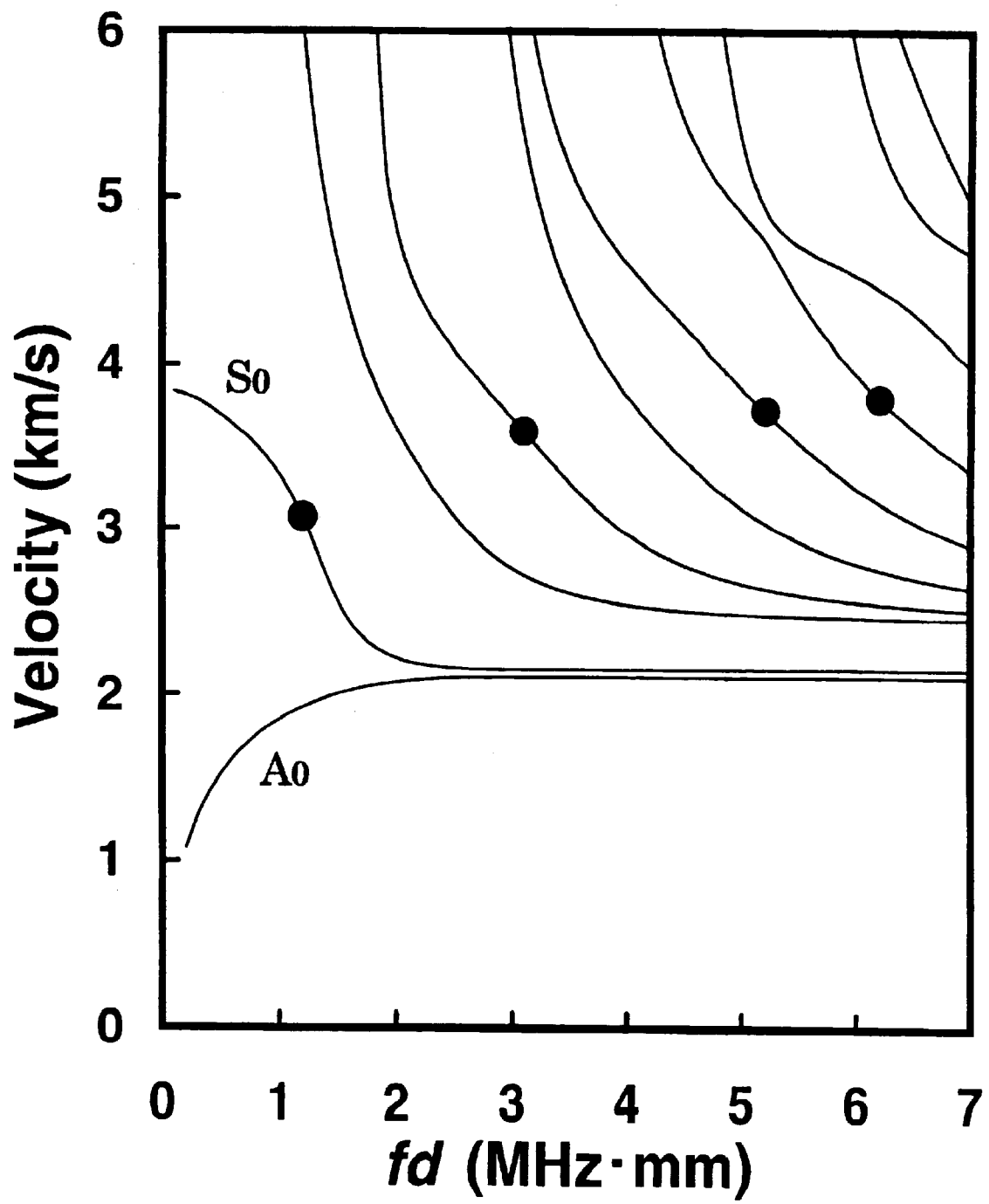
FIG. 6 shows a relationship between the phase velocity of the elastic wave for each mode in piezoelectric substrate 1, and the fd value.

FIG. 6 shows a relationship between the phase velocity of the elastic wave for each mode in piezoelectric substrate 1, and the fd value. The fd value at each mark ● has the maximum $k^2$ value where an electric energy applied to input interdigital transducer 2 is most effectively transduced to the elastic wave, the maximum $k^2$ value being obtained from FIG. 5. The phase velocity of the elastic wave at each mark ● is approximately 3500 m/s.

Figure 7:
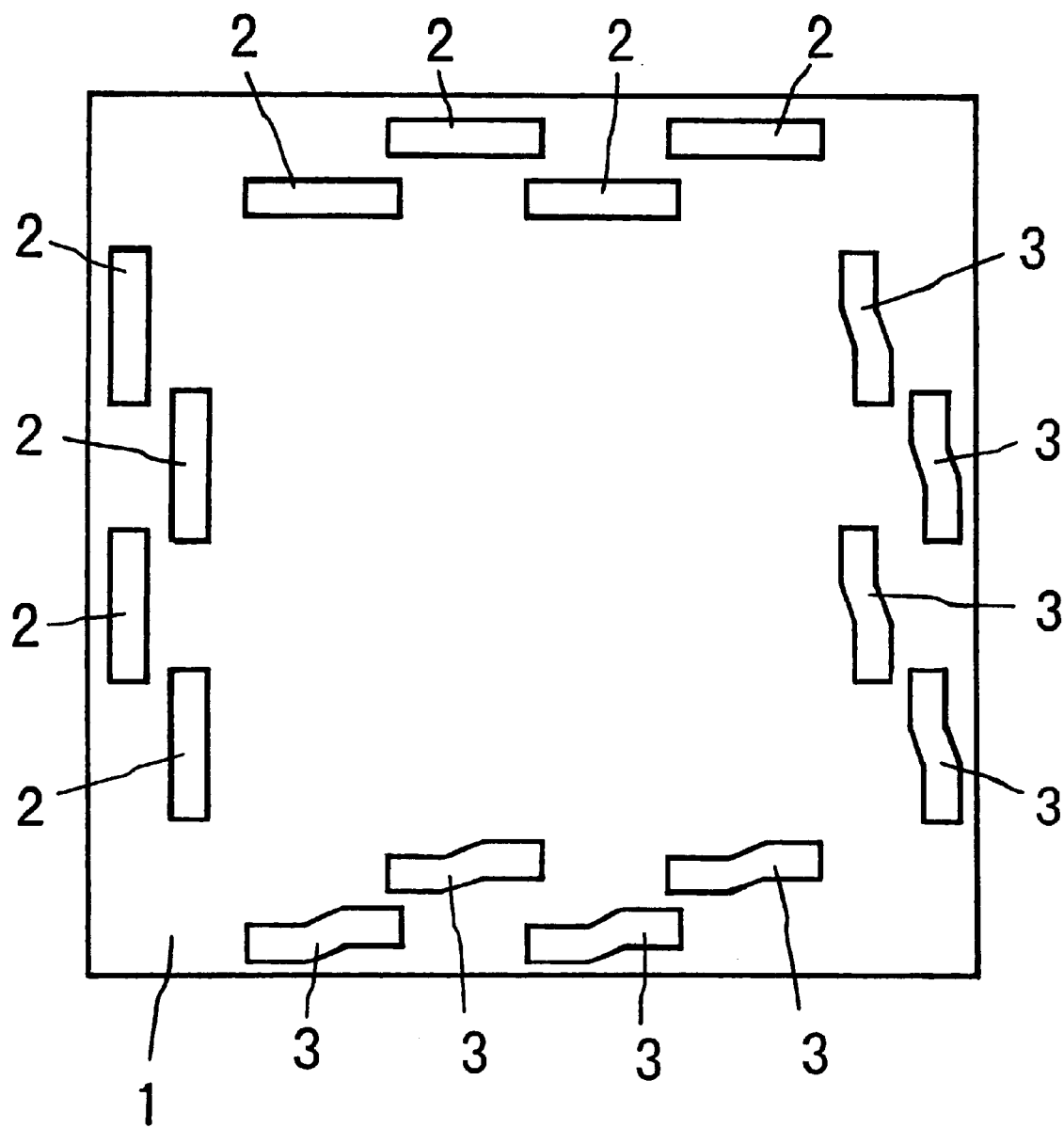
FIG. 7 shows a plan view of an ultrasonic touch-position sensing device according to a second embodiment of the present invention.

FIG. 7 shows a plan view of an ultrasonic touch-position sensing device according to a second embodiment of the present invention. The ultrasonic touch-position sensing device comprises piezoelectric substrate 1, ultrasonic transducing units X and Y, and signal controller 5. Each of ultrasonic transducing units X and Y comprises four input interdigital transducers 2 formed on the upper end surface of piezoelectric substrate 1, four output interdigital transducers 3 formed on the upper end surface of piezoelectric substrate 1 and opposed to input interdigital transducers 2, respectively, amplifier 4, and switch 6. FIG. 7 shows only piezoelectric substrate 1, input interdigital transducers 2, and output interdigital transducers 3.

Figure 8:
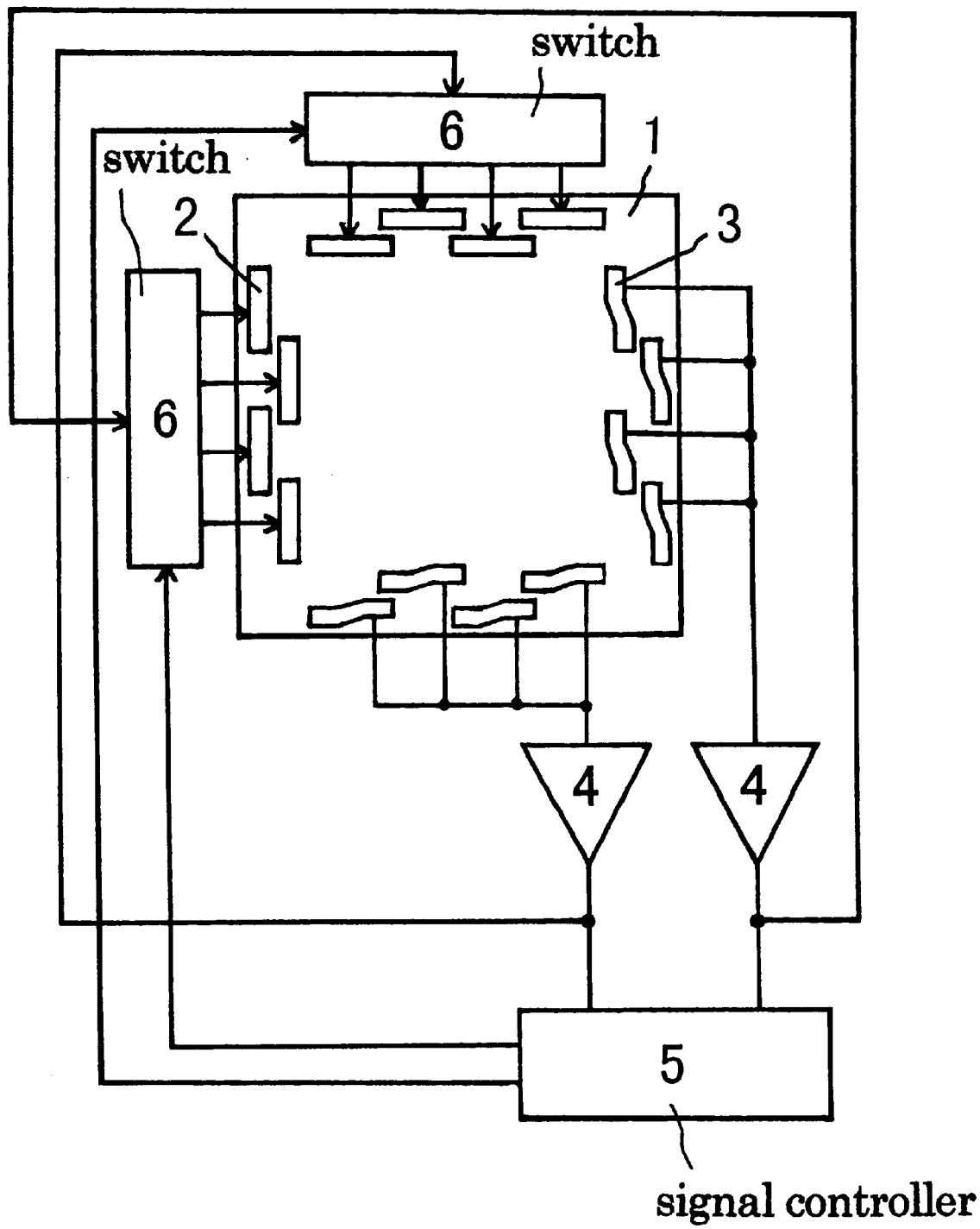
FIG. 8 shows a diagram of a circuit for the ultrasonic touch-position sensing device in FIG. 7.

FIG. 8 shows a diagram of a circuit for the ultrasonic touch-position sensing device in FIG. 7. Output terminals of four output interdigital transducers 3 are connected with each other at an output point. The output point is connected with an input terminal of switch 6 and that of signal controller 5, via amplifier 4. Input terminals of four input interdigital transducers 2 are connected with four output terminals of switch 6 supplying four input interdigital transducers 2 with an electric signal with a fixed period in turn. When an electric signal having a frequency approximately corresponding to the interdigital periodicity P is applied to each input interdigital transducer 2 via switch 6, an elastic wave having the wavelength approximately equal to the interdigital periodicity P is excited in piezoelectric substrate 1. The elastic wave is transduced to the electric signal $E_{1a}$ with the frequency $f_{1a}$ and the electric signal $E_{1b}$ with the frequency $f_{1b}$, at zones $R_{1a}$ and $R_{1b}$, of each output interdigital transducer 3, respectively. When touching on position $F_{1a}$ or $F_{1b}$ on the upper- or lower end surface of piezoelectric substrate 1, the electric signal $E_{1b}$ or $E_{1a}$ is delivered, respectively, at the output point connecting the output terminals of four output interdigital transducers 3. Signal controller 5 senses a touch on position $F_{1a}$ or $F_{1b}$ by detecting the frequency $f_{1b}$ or $f_{1a}$, and by finding only one input interdigital transducer 2 supplied with the electric signal via switch 6 just when the electric signal $E_{1b}$ or $E_{1a}$ is detected at the output point connecting the output terminals of four output interdigital transducers 3. The use of switch 6 causes a small-sized circuit with a simple structure which is very light in weight. The touched position $F_{1a}$ or $F_{1b}$ with respect to ultrasonic transducing unit X and that with respect to ultrasonic transducing unit Y are specified at the same time. The electric signal $E_{1a}$ or $E_{1b}$ delivered at the output point connecting the output terminals of four output interdigital transducers 3 is amplified via amplifier 4, a part of the amplified electric signal being applied to each input interdigital transducer 2, via switch 6, again. Thus, input interdigital transducer 2, output interdigital transducer 3, and amplifier 4 form an oscillator only when touching on position $F_{1a}$ or $F_{1b}$.

Figure 9:
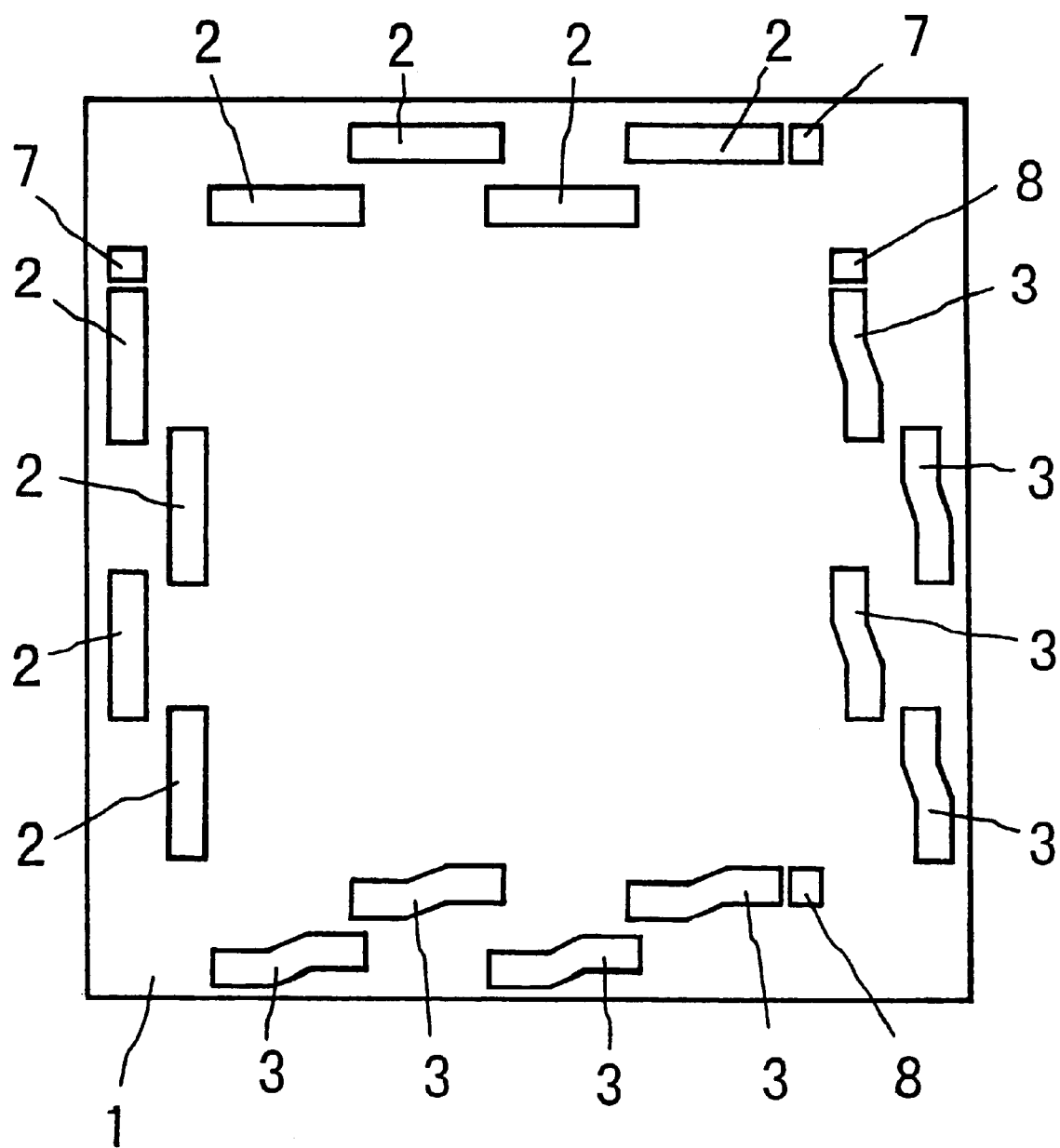
FIG. 9 shows a plan view of an ultrasonic touch-position sensing device according to a third embodiment of the present invention.

FIG. 9 shows a plan view of an ultrasonic touch-position sensing device according to a third embodiment of the present invention. The ultrasonic touch-position sensing device comprises piezoelectric substrate 1, ultrasonic transducing units X and Y, and signal controller 5. Each of ultrasonic transducing units X and Y comprises four input interdigital transducers 2 formed on the upper end surface of piezoelectric substrate 1, four output interdigital transducers 3 formed on the upper end surface of piezoelectric substrate 1 and opposed to input interdigital transducers 2, respectively, reference input interdigital transducer 7, reference output interdigital transducer 8, amplifier 4, amplifier 9, switch 6, and phase comparator 10. FIG. 9 shows only piezoelectric substrate 1, input interdigital transducers 2, output interdigital transducers 3, reference input interdigital transducers 7, and reference output interdigital transducers 8. Reference input interdigital transducer 7 and reference output interdigital transducer 8 have the same regular-type constructions, and have ten finger pairs and an interdigital periodicity P of 1.7 mm, respectively.

Figure 10:
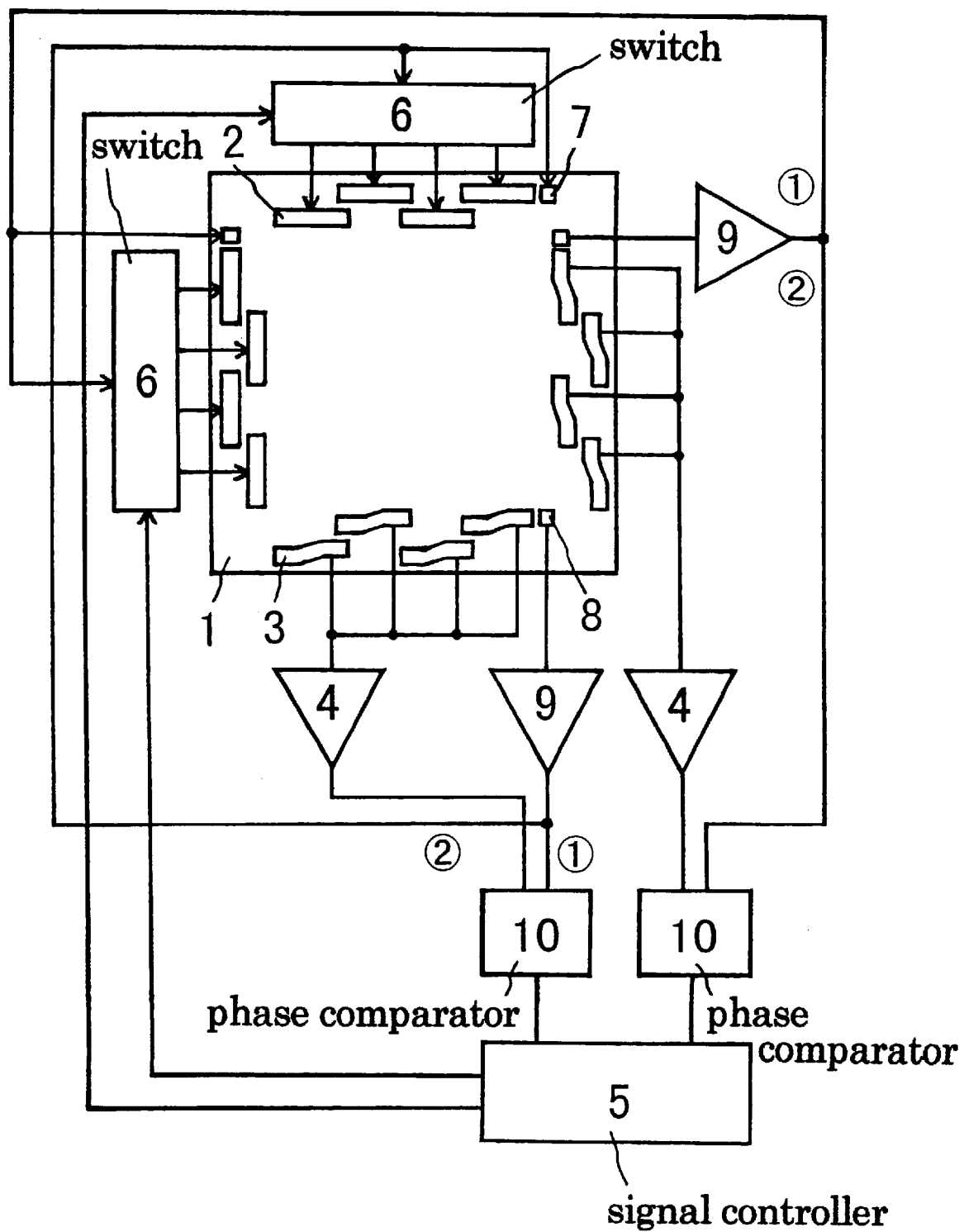
FIG. 10 shows a diagram of a circuit for the ultrasonic touch-position sensing device in FIG. 9.

FIG. 10 shows a diagram of a circuit for the ultrasonic touch-position sensing device in FIG. 9. Output terminals of four output interdigital transducers 3 are connected with each other at an output point. The output point is connected with an input terminal of phase comparator 10 via amplifier 4. An output terminal of reference output interdigital transducer 8 is connected with an input terminal of reference input interdigital transducer 7, an input terminal of switch 6 and the input terminal of phase comparator 10, via amplifier 9. Input terminals of four input interdigital transducers 2 are connected with four output terminals of switch 6. When an electric signal having a frequency approximately corresponding to the interdigital periodicity P of reference input interdigital transducer 7 is applied to reference input interdigital transducer 7, an elastic wave having the wavelength approximately equal to the interdigital periodicity P is excited in piezoelectric substrate 1. The elastic wave is transduced to an electric signal with a phase $\theta_{base}$ at reference output interdigital transducer 8, the electric signal being delivered from reference output interdigital transducer 8 and amplified via amplifier 9. An amplified electric signal ① is applied to reference input interdigital transducer 7 and switch 6, again. Thus, reference input interdigital transducer 7, reference output interdigital transducer 8 and amplifier 9 form an oscillator. The other amplified electric signal ② is applied to phase comparator 10. When an electric signal is applied to each input interdigital transducer 2 via switch 6, an elastic wave is excited in piezoelectric substrate 1. The elastic wave is transduced to the electric signal $E_{1a}$ with a phase $\theta_{1a}$ and the electric signal $E_{1b}$ with a phase $\theta_{1b}$, at zones $R_{1a}$ and $R_{1b}$ of each output interdigital transducer 3, respectively. When touching on position $F_{1a}$ or $F_{1b}$ on the upper- or lower end surface of piezoelectric substrate 1, the electric signal $E_{1b}$ or $E_{1a}$ is delivered, respectively, at the output point connecting the output terminals of four output interdigital transducers 3. The electric signal $E_{1b}$ or $E_{1a}$ is applied, via amplifier 4, to phase comparator 10 detecting a difference between the phases $\theta_{1b}$ and $\theta_{base}$, $(\theta_{base}-\theta_{1b})$ or a difference between the phases $\theta_{1a}$ and $\theta_{base}$, $(\theta_{base}-\theta_{1a})$. Signal controller 5 senses a touch on position $F_{1a}$ or $F_{1b}$ by evaluating the phase difference $(\theta_{base}-\theta_{1b})$ or the phase difference $(\theta_{base}-\theta_{1a})$, respectively, and by finding only one input interdigital transducer 2 supplied with the electric signal via switch 6 just when the electric signal $E_{1b}$ or $E_{1a}$ is detected at the output point connecting the output terminals of four output interdigital transducers 3. The touched position $F_{1a}$ or $F_{1b}$ with respect to ultrasonic transducing unit X and that with respect to ultrasonic transducing unit Y are specified at the same time.

Figure 11:
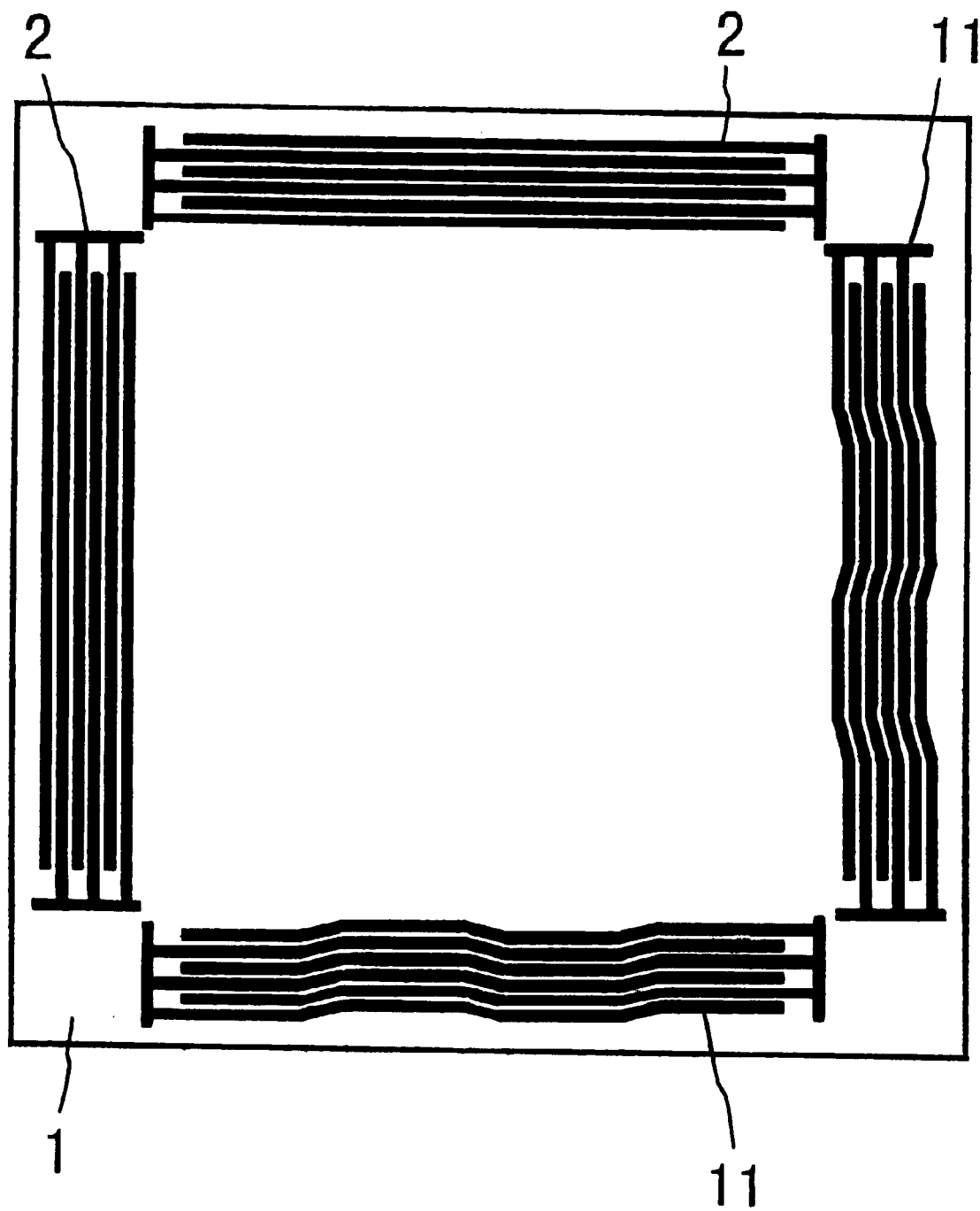
FIG. 11 shows a plan view of an ultrasonic touch-position sensing device according to a fourth embodiment of the present invention.

FIG. 11 shows a plan view of an ultrasonic touch-position sensing device according to a fourth embodiment of the present invention. The ultrasonic touch-position sensing device has the same construction as FIG. 1, except for using of output interdigital transducer 11 in place of output interdigital transducer 3.

Figure 12:
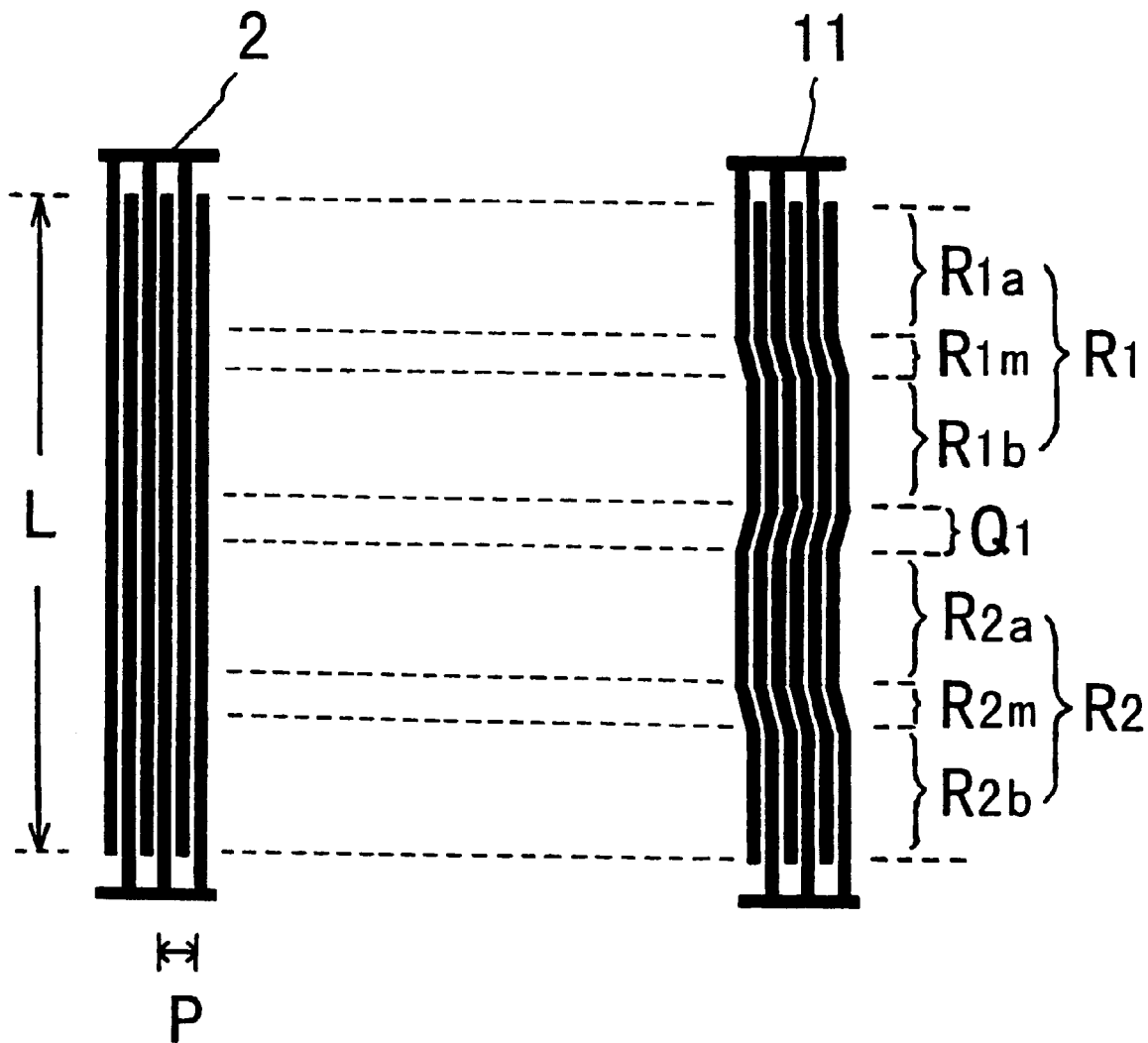
FIG. 12 shows the relative positions of input interdigital transducer 2 and output interdigital transducer 11.

FIG. 12 shows the relative positions of input interdigital transducer 2 and output interdigital transducer 11 having ten finger pairs. Output interdigital transducer 11 has finger-overlap zones $R_1$ and $R_2$, and finger-overlap zone $Q_1$ between finger-overlap zones $R_1$ and $R_2$. In other words, output interdigital transducer 11 has N finger-overlap zones $R_i$ (i=1, 2, ..., N) and N−1 finger-overlap zones $Q_i$ {i=1, 2, ..., (N−1)} between two finger-overlap zones $R_i$ and $R_{(i+1)}$, then N is two. Finger-overlap zone $R_1$ comprises first zone $R_{1a}$, second zone $R_{1b}$, and third zone $R_{1m}$ between zones $R_{1a}$ and $R_{1b}$. Finger-overlap zone $R_2$ comprises first zone $R_{2a}$, second zone $R_{2b}$, and third zone $R_{2m}$ between zones $R_{2a}$ and $R_{2b}$. The finger direction of zones $R_{1a}$, $R_{1b}$, $R_{2a}$ and $R_{2b}$, runs parallel with that of input interdigital transducer 2. An interdigital periodicity of zones $R_{1a}$, $R_{1b}$, $R_{2a}$ and $R_{2b}$, is equal to the interdigital periodicity P of input interdigital transducer 2. A structure of zone $R_{2m}$ is the same as that of zone $R_{1m}$, which is equivalent to zone $R_{1m}$ in FIG. 3.

Figure 13:
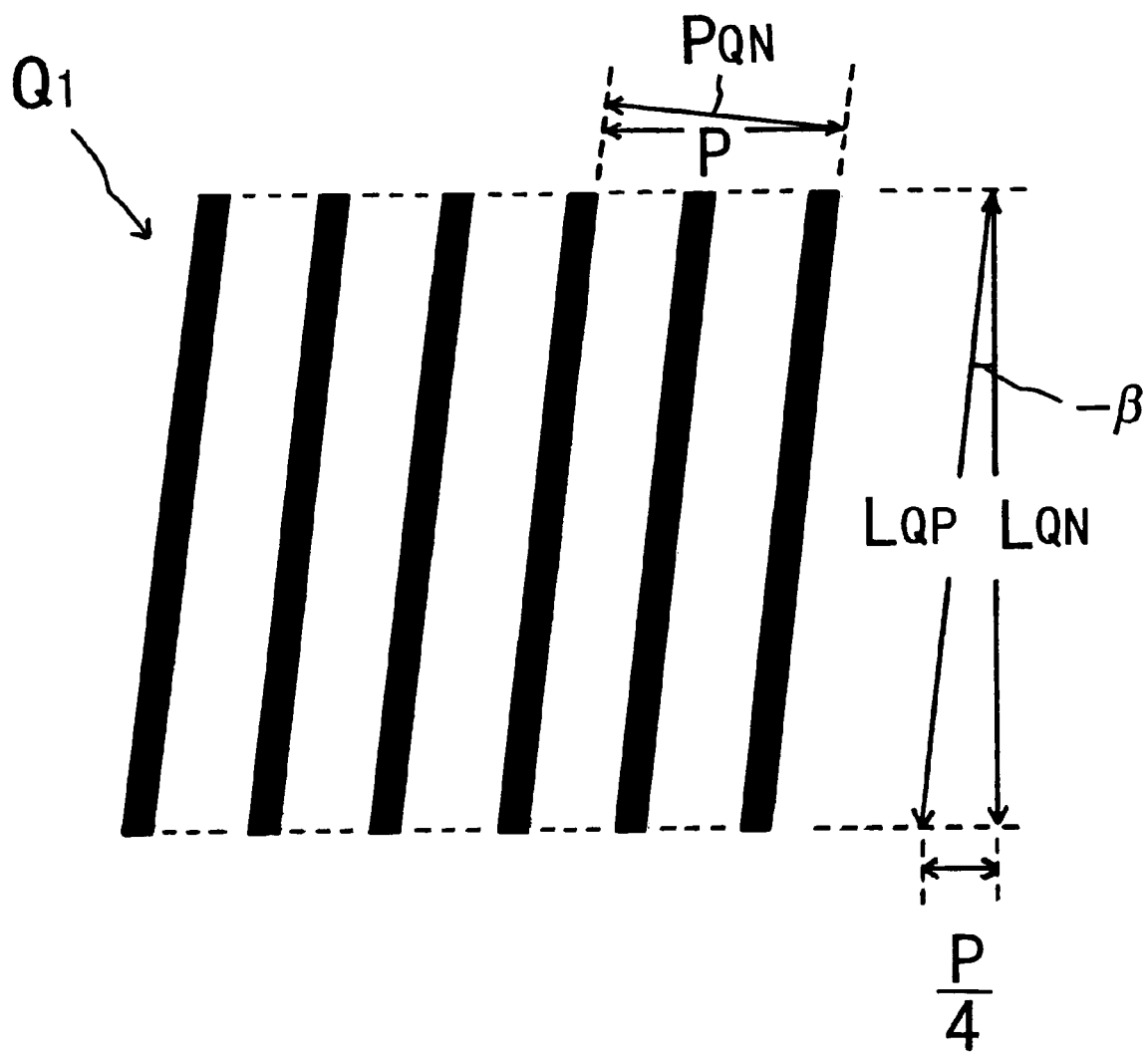
FIG. 13 shows a plan view, on an enlarged scale, of finger-overlap zone $Q_l$.

FIG. 13 shows a plan view, on an enlarged scale, of finger-overlap zone $Q_1$. The finger direction of finger-overlap zone $Q_1$ can be slanting to that of input interdigital transducer 2 by an angle +β or −β, that is ±β. However, in this embodiment, the finger direction of finger-overlap zone $Q_1$ is slanting to that of input interdigital transducer 2 by an angle −β. An interdigital periodicity $P_{QN}$ along the vertical direction to the finger direction of finger-overlap zone $Q_1$ is equal to the product of the interdigital periodicity P and cos β. Finger-overlap zone $Q_1$ has a first overlap length $L_{QP}$ along the finger direction thereof and a second overlap length $L_{QN}$ along the finger direction of input interdigital transducer 2. The overlap length $L_{QP}$ is equal to the product of the overlap length $L_{QN}$ and sec β. The overlap length $L_{QP}$ is also equal to the product of cosec β and the interdigital periodicity P divided by 4, that is, the product of P/4 and cosec β. The sum of the overlap length (3 mm) of zone $R_{1a}$, the overlap length (3 mm) of zone $R_{1b}$, the overlap length (3 mm) of zone $R_{2a}$, the overlap length (3 mm) of zone $R_{2b}$, the overlap length $L_{RN}$ (1 mm) of zone $R_{1m}$, the overlap length $L_{RN}$ (1 mm) of zone $R_{2m}$, and the overlap length $L_{QN}$ (1 mm) of finger-overlap zone $Q_i$ is equal to the overlap length L (15 mm).

When operating the ultrasonic touch-position sensing device according to the fourth embodiment in FIG. 11, the circuit, in FIG. 4, except for using of output interdigital transducer 11 in place of output interdigital transducer 3, is available. If an electric signal is applied to input interdigital transducer 2, an elastic wave is excited in piezoelectric substrate 1. The elastic wave is transduced to electric signals $E_{1a}$, $E_{1b}$, $E_{2a}$ and $E_{2b}$, at zones $R_{1a}$, $R_{1b}$, $R_{2a}$ and $R_{2b}$, respectively. In this time, the sum of the electric signals $E_{1a}$ and $E_{1b}$ is zero, and the sum of the electric signals $E_{2a}$ and $E_{2b}$ is zero, because that the overlap length $L_{RP}$ is equal to the product of the overlap length $L_{RN}$ and sec α as well as the product of P/2 and cosec α. Input interdigital transducer 2 and output interdigital transducer 11 form four ultrasound propagation lanes $Z_{1a}$, $Z_{1b}$, $Z_{2a}$ and $Z_{2b}$, in piezoelectric substrate 1, corresponding to zones $R_{1a}$, $R_{1b}$, $R_{2a}$ and $R_{2b}$, respectively, ultrasound propagation lanes $Z_{1a}$ and $Z_{1b}$ making a pair, and ultrasound propagation lanes $Z_{2a}$ and $Z_{2b}$ making a pair. Ultrasound propagation lanes $Z_{1a}$, $Z_{1b}$, $Z_{2}$a and $Z_{2b}$ correspond to positions $F_{1a}$, $F_{1b}$, $F_{2a}$ and $F_{2b}$, on the upper- or lower end surface of piezoelectric substrate 1, respectively. When touching on position $F_{1a}$, $F_{1b}$, $F_{2a}$ or $F_{2b}$, the electric signal $E_{1b}$, $E_{1a}$, $E_{2a}$ or $E_{2b}$ is delivered, respectively, at output interdigital transducer 11. The electric signal $E_{1b}$, $E_{1a}$, $E_{2a}$ or $E_{2b}$ has the frequency $f_{1b}$, $f_{1a}$, $f_{2b}$ or $f_{2a}$, respectively. Signal controller 5 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the second embodiment in FIG. 7 has output interdigital transducer 11 in place of output interdigital transducer 3, the circuit, in FIG. 8, except for using of output interdigital transducer 11 in place of output interdigital transducer 3, is available. When an electric signal is applied to each input interdigital transducer 2 via switch 6, an elastic wave is excited in piezoelectric substrate 1. The elastic wave is transduced to the electric signals $E_{1a}$, $E_{1b}$, $E_{2a}$ and $E_{2b}$, at zones $R_{1a}$, $R_{1b}$, $R_{2a}$ and $R_{2b}$ of each output interdigital transducer 11, respectively. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 11. Signal controller 5 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively, and by finding only one input interdigital transducer 2 supplied with the electric signal via switch 6 just when the electric signal $E_{1b}$, $E_{1a}$, $E_{2b}$ or $E_{2a}$ is detected at the output point connecting the output terminals of four output interdigital transducers 11. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the third embodiment in FIG. 9 has output interdigital transducer 11 in place of output interdigital transducer 3, the circuit, in FIG. 10, except for using of output interdigital transducer 11 in place of output interdigital transducer 3, is available. When an electric signal is applied to each input interdigital transducer 2 via switch 6, an elastic wave is excited in piezoelectric substrate 1. The elastic wave is transduced to the electric signals $E_{1a}$, $E_{1b}$, $E_{2a}$ and $E_{2b}$, at zones $R_{1a}$, $R_{1b}$, $R_{2a}$ and $R_{2b}$ of each output interdigital transducer 11, respectively. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 11. The electric signal $E_{1b}$, $E_{1a}$, $E_{2b}$ or $E_{2a}$, having a phase $\theta_{1b}$, $\theta_{1a}$, $\theta_{2b}$ or $\theta_{2a}$, respectively, is applied, via amplifier 4, to phase comparator 10 detecting a difference between the phases $\theta_{1b}$ and $\theta_{base}$, ($\theta_{base}-\theta_{1b}$) a difference between the phases $\theta_{1a}$ and $\theta_{base}$, ($\theta_{base}-\theta_{1a}$), a difference between the phases $\theta_2 b$ and $\theta_{base}$, ($\theta_{base}-\theta_{2b}$), or a difference between the phases $\theta_{2a}$ and $\theta_{base}$, ($\theta_{base}-\theta_{2a}$). Signal controller 5 senses a touch on position $F_{1a}$, $F_{1b}$, $F_{2a}$ or $F_{2b}$ by evaluating the phase difference ($\theta_{base}-\theta_{1b}$), the phase difference ($\theta_{base}-\theta_{1a}$), the phase difference ($\theta_{base}-\theta_{2b}$), or the phase difference ($\theta_{base}-\theta_{2a}$) respectively, and by finding only one input interdigital transducer 2 supplied with the electric signal via switch 6 just when the electric signal $E_{1b}$, $E_{1a}$, $E_{2b}$ or $E_{2a}$ is detected at the output point connecting the output terminals of four output interdigital transducers 11. The touched position $F_{1a}$, $F_{1b}$, $F_{2a}$ or $F_{2b}$ with respect to ultrasonic transducing unit X and that with respect to ultrasonic transducing unit Y are specified at the same time.

Figure 14:
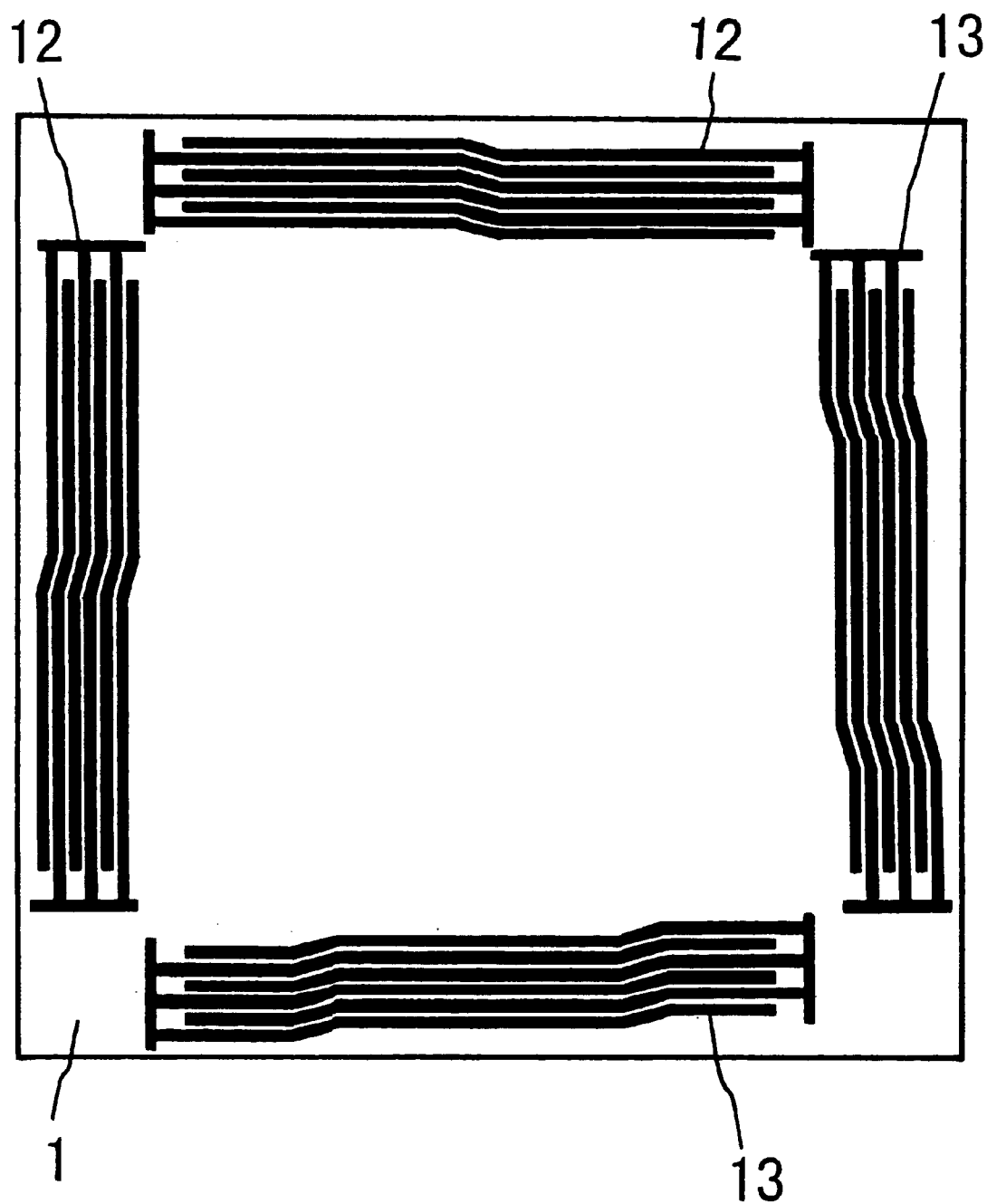
FIG. 14 shows a plan view of an ultrasonic touch-position sensing device according to a fifth embodiment of the present invention.

FIG. 14 shows a plan view of an ultrasonic touch-position sensing device according to a fifth embodiment of the present invention. The ultrasonic touch-position sensing device has the same construction as FIG. 1, except for using of input interdigital transducer 12 and output interdigital transducer 13 in place of input interdigital transducer 2 and output interdigital transducer 3, respectively.

Figure 15:
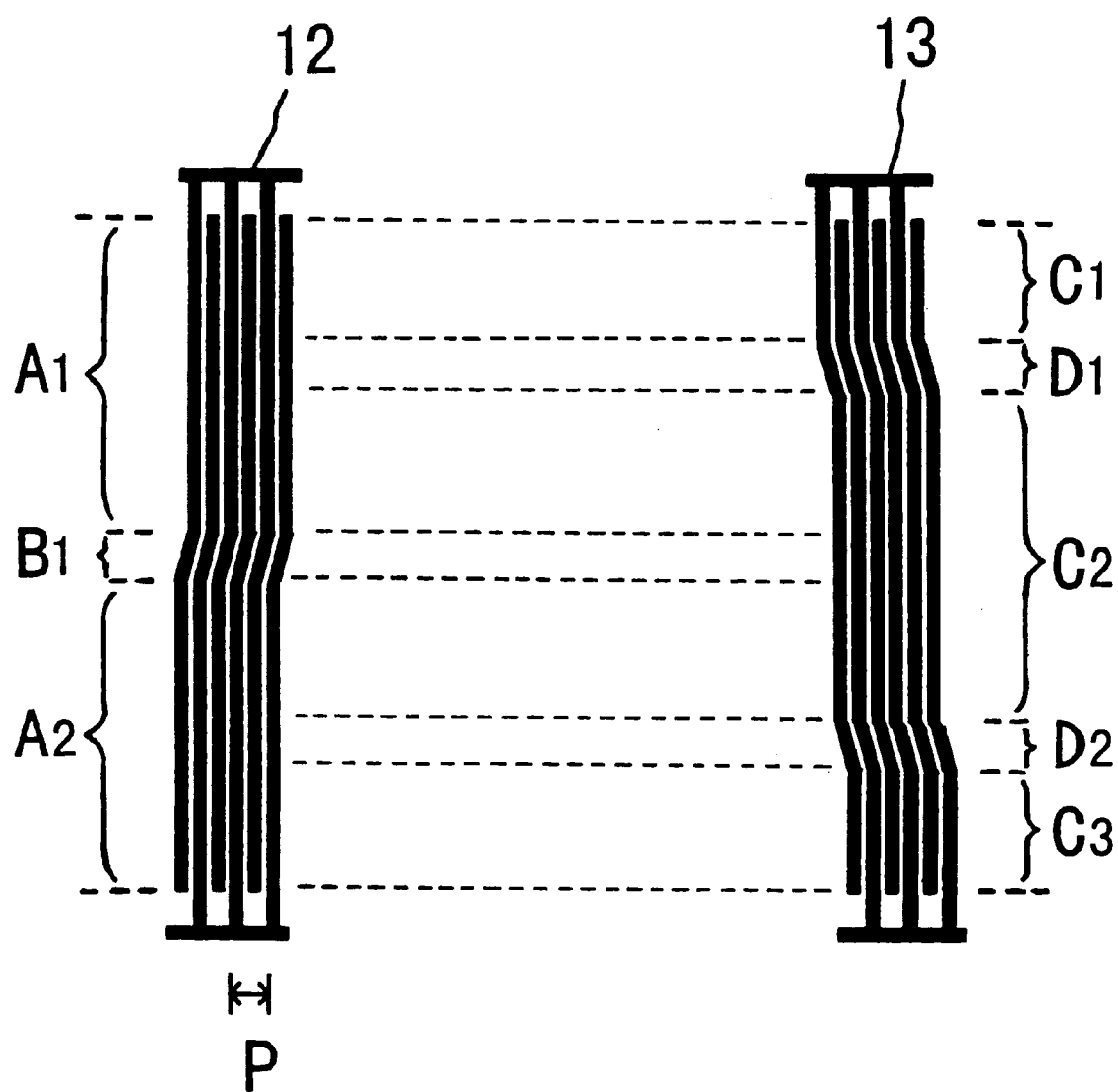
FIG. 15 shows the relative positions of input interdigital transducer 12 and output interdigital transducer 13.

FIG. 15 shows the relative positions of input interdigital transducer 12 and output interdigital transducer 13 having ten finger pairs, respectively. Input interdigital transducer 12 has finger-overlap zones $A_1$ and $A_2$, and finger-overlap zone $B_1$ between finger-overlap zones $A_1$ and $A_2$. Output interdigital transducer 13 has finger-overlap zones $C_1$, $C_2$ and $C_3$, finger-overlap zone $D_1$ between finger-overlap zones $C_1$ and $C_2$, and finger-overlap zone $D_2$ between finger-overlap zones $C_2$ and $C_3$. In other words, input interdigital transducer 12 has N finger-overlap zones $A_i$ (i=1, 2, ..., N) and N−1 finger-overlap zones $B_i$ {i=1, 2, ..., (N−1)}, and output interdigital transducer 13 has N+1 finger-overlap zones $C_i$ {i=1, 2, ..., (N+1)} and N finger-overlap zones $D_i$ (i=1, 2, ..., N), then N is two. The finger direction of finger-overlap zones $A_1$ and $A_2$ runs parallel with that of finger-overlap zones $C_1$, $C_2$ and $C_3$. Each of finger-overlap zones $A_1$, $A_2$, $C_1$, $C_2$ and $C_3$ has an interdigital periodicity P of 1.7 mm.

Figure 16:
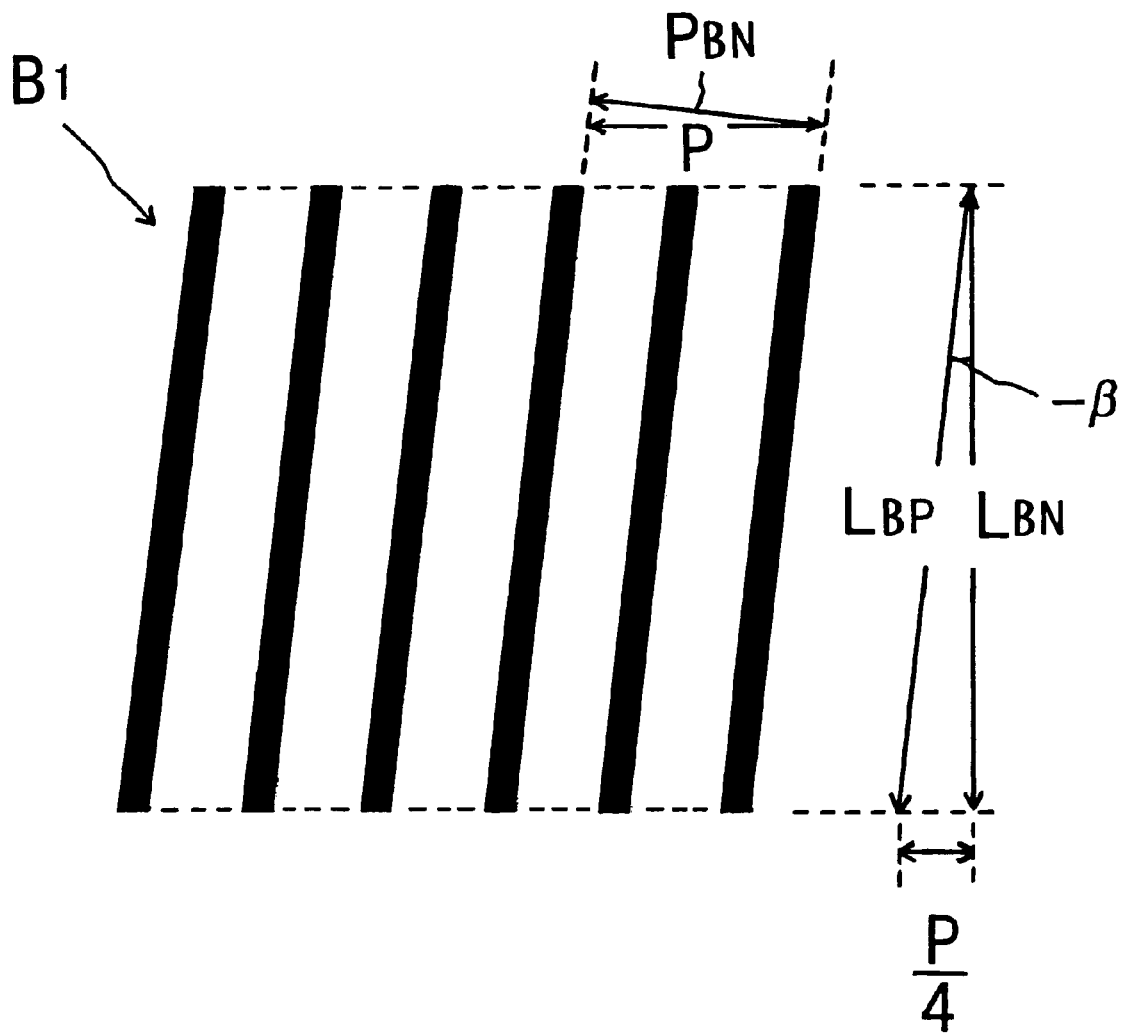
FIG. 16 shows a plan view, on an enlarged scale, of finger-overlap zone $B_1$.

FIG. 16 shows a plan view, on an enlarged scale, of finger-overlap zone $B_1$. The finger direction of finger-overlap zone $B_1$ is slanting to that of finger-overlap zones $A_1$ and $A_2$ by an angle −β. An interdigital periodicity $P_{BN}$ along the vertical direction to the finger direction of finger-overlap zone $B_1$ is equal to the product of the interdigital periodicity P and cos β. Finger-overlap zone $B_1$ has a first overlap length $L_{BP}$ along the finger direction thereof and a second overlap length $L_{BN}$ along the finger direction of finger-overlap zones $A_1$ and $A_2$. The overlap length $L_{BP}$ is equal to the product of the overlap length $L_{BN}$ and sec β. The overlap length $L_{BP}$ is also equal to the product of cosec β and the interdigital periodicity P divided by 4, that is, the product of P/4 and cosec β.

Figure 17:
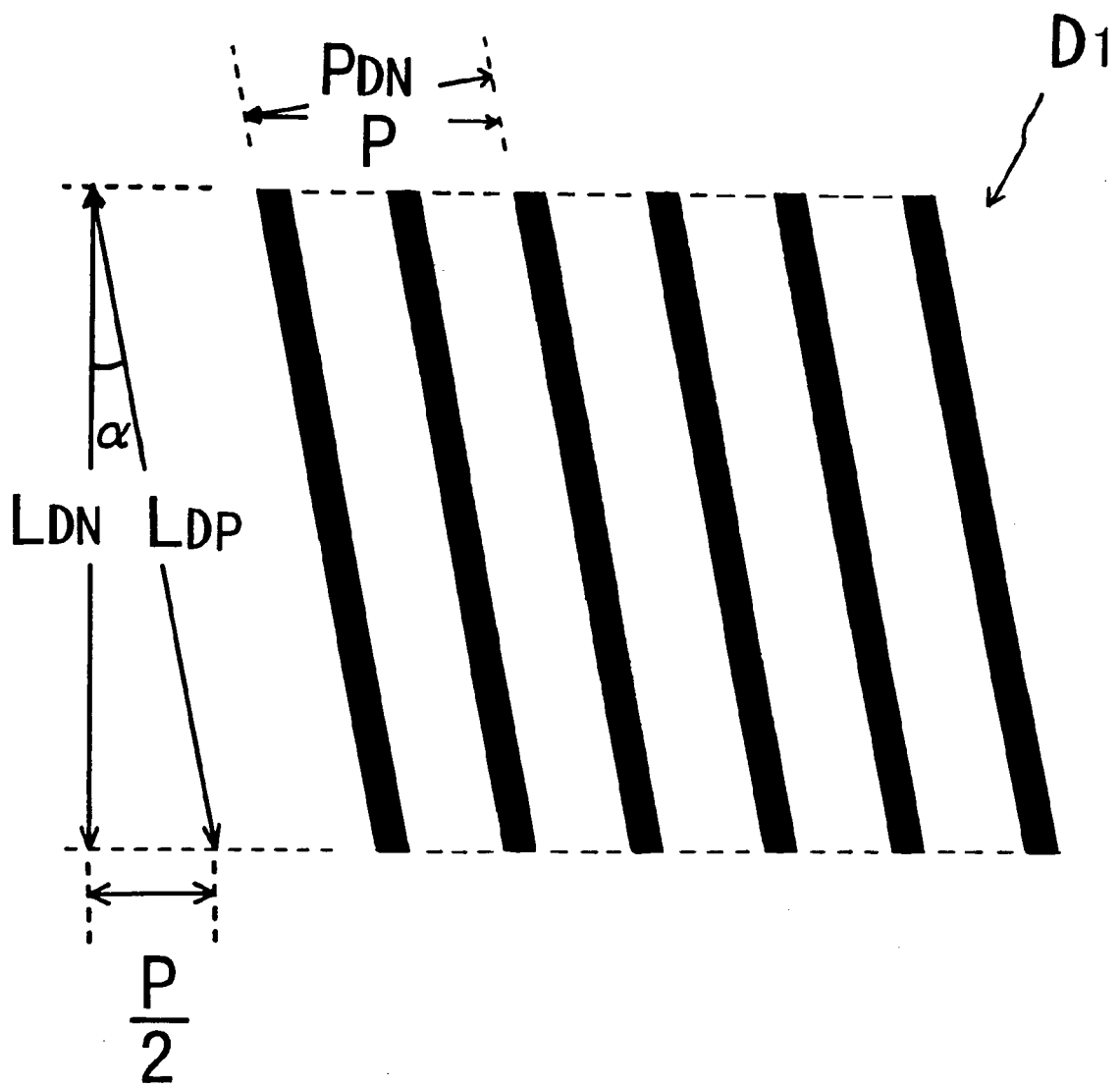
FIG. 17 shows a plan view, on an enlarged scale, of finger-overlap zone $D_1$.

FIG. 17 shows a plan view, on an enlarged scale, of finger-overlap zone $D_1$. Finger-overlap zone $D_2$ has the same construction as finger-overlap zone $D_1$. The finger direction of finger-overlap zones $D_1$ and $D_2$ is slanting to that of finger-overlap zones $C_1$, $C_2$ and $C_3$ by an angle α. An interdigital periodicity $P_{DN}$ along the vertical direction to the finger direction of finger-overlap zone $D_1$ is equal to the product of the interdigital periodicity P and cos α. Finger-overlap zone $D_1$ has a first overlap length $L_{DP}$ along the finger direction thereof and a second overlap length $L_{DN}$ along the finger direction of finger-overlap zones $C_1$, $C_2$ and $C_3$. The overlap length $L_{DP}$ is equal to the product of the overlap length $L_{DN}$ and sec α. The overlap length $L_{DP}$ is also equal to the product of cosec α and the interdigital periodicity P divided by 2, that is, the product of P/2 and cosec α. The sum of the overlap length (7 mm) of finger-overlap zone $A_1$, the overlap length (7 mm) of finger-overlap zone $A_2$ and the overlap length $L_{BN}$ (1 mm) of finger-overlap zone $B_1$ is equal to the sum of the overlap length (3 mm) of finger-overlap zone $C_1$, the overlap length (3 mm) of finger-overlap zone $C_3$, the overlap length (7 mm) of finger-overlap zone $C_2$, the overlap length $L_{DN}$ (1 mm) of finger-overlap zone $D_1$ and the overlap length $L_{DN}$ (1 mm) of finger-overlap zone $D_2$.

When operating the ultrasonic touch-position sensing device according to the fifth embodiment in FIG. 14, the circuit, in FIG. 4, except for using of input interdigital transducer 12 and output interdigital transducer 13 in place of input interdigital transducer 2 and output interdigital transducer 3, respectively, is available. If an electric signal is applied to input interdigital transducer 12, an elastic wave is excited in piezoelectric substrate 1. The elastic wave is transduced to two electric signals $E_{1a}$ and $E_{2a}$, and two electric signals $E_{1a}$, and $E_{2b}$ at output interdigital transducer 13. In this time, the sum of the electric signals $E_{1a}$ and $E_{1b}$ is zero, and the sum of the electric signals $E_{2a}$ and $E_{2b}$ is zero, because that the overlap length $L_{DP}$ is equal to the product of the overlap length $L_{DN}$ and sec α as well as the product of P/2 and cosec α. Input interdigital transducer 12 and output interdigital transducer 13 form two ultrasound propagation lanes $Z_{1a}$ and $Z_{2a}$, and two ultrasound propagation lanes $Z_{1b}$ and $Z_{2b}$, in piezoelectric substrate 1, ultrasound propagation lane $Z_{1a}$ existing between finger-overlap zones $A_1$ and $C_1$, ultrasound propagation lane $Z_{1b}$ existing between finger-overlap zones $A_1$ and $C_2$, ultrasound propagation lane $Z_{2a}$ existing between finger-overlap zones $A_2$ and $C_2$, ultrasound propagation lane $Z_{2b}$ existing between finger-overlap zones $A_2$ and $C_3$. When touching on position $F_{1a}$, $F_{1b}$, $F_{2a}$ or $F_{2b}$, the electric signal $E_{1b}$, $E_{1a}$, $E_{2b}$ or $E_{2a}$ is delivered at output interdigital transducer 13, respectively, position $F_{1a}$, $F_{1b}$, $F_{2a}$ or $F_{2b}$ corresponding with ultrasound propagation lane $Z_{1a}$, $Z_{1b}$, $Z_{2a}$ or $Z_{2b}$, respectively, the electric signal $E_{1b}$, $E_{1a}$, $E_{2b}$ or $E_{2a}$ having a frequency $f_{1b}$, $f_{1a}$, $f_{2b}$ or $f_{2a}$, respectively. In this time, whether touching on position $F_{1a}$, $F_{1b}$, $F_{2a}$ or $F_{2b}$, or nowhere on the upper- or lower end surface of piezoelectric substrate 1, an electric signal transduced by finger-overlap zone $D_1$ and that transduced by finger-overlap zone $D_2$ are not delivered at output interdigital transducer 13. Signal controller 5 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the second embodiment in FIG. 7 has input interdigital transducer 12 and output interdigital transducer 13 in place of input interdigital transducer 2 and output interdigital transducer 3, respectively, the circuit, in FIG. 8, except for using of input interdigital transducer 12 and output interdigital transducer 13 in place of input interdigital transducer 2 and output interdigital transducer 3, respectively, is available. When an electric signal is applied to each input interdigital transducer 12 via switch 6, an elastic wave is excited in piezoelectric substrate 1. The elastic wave is transduced to two electric signals $E_{1a}$ and $E_{2a}$, and two electric signals $E_{1b}$ and $E_{2b}$ at each output interdigital transducer 13. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 13. Signal controller 5 senses a touch on position $F_{1a}$, $F_{1b}$, $F_{2a}$ or $F_{2b}$ by detecting the frequency $f_{1b}$, $f_{1a}$, $f_{2b}$ or $f_{2a}$, respectively, and by finding only one input interdigital transducer 12 supplied with the electric signal via switch 6 just when the electric signal $E_{1b}$, $E_{1a}$, $E_{2b}$ or $E_{2a}$ is detected at the output point connecting the output terminals of four output interdigital transducers 13. The touched position $F_{1a}$, $F_{1b}$, $F_{2a}$ or $F_{2b}$ with respect to ultrasonic transducing unit X and that with respect to ultrasonic transducing unit Y are specified at the same time.

If the ultrasonic touch-position sensing device according to the third embodiment in FIG. 9 has input interdigital transducer 12 and output interdigital transducer 13 in place of input interdigital transducer 2 and output interdigital transducer 3, the circuit, in FIG. 10, except for using of input interdigital transducer 12 and output interdigital transducer 13 in place of input interdigital transducer 2 and output interdigital transducer 3, is available. When an electric signal is applied to each input interdigital transducer 12 via switch 6, an elastic wave is excited in piezoelectric substrate 1. The elastic wave is transduced to two electric signals $E_{1a}$ and $E_{2a}$, and two electric signals $E_{1b}$ and $E_{2b}$ at each output interdigital transducer 13, the electric signal $E_{1a}$, $E_{2a}$, $E_{1b}$, or $E_{2b}$ having a phase $\theta_{1a}, \theta_{2a}, \theta_{1b}$ or $\theta_{2b}$, respectively. When touching on position $F_{1a}$, $F_{1b}$, $F_{2a}$ or $F_{2b}$, the electric signal $E_{1b}$, $E_{1a}$, $E_{2b}$ or $E_{2a}$ is delivered, respectively, at the output point connecting the output terminals of four output interdigital transducers 13. The electric signal $E_{1b}$, $E_{1a}$, $E_{2b}$ or $E_{2a}$ is applied, via amplifier 4, to phase comparator 10 detecting a difference between the phases $\theta_{1b}$ and $\theta_{base}$ ($\theta_{base}-\theta_{1b}$), a difference between the phases $\theta_{1a}$ and $\theta_{base}$ ($\theta_{base}-\theta_{1a}$), a difference between the phases $\theta_{2b}$ and $\theta_{base}$ ($\theta_{base}-\theta_{2b}$), or a difference between the phases $\theta_{2a}$ and $\theta_{base}$ ($\theta_{base}-\theta_{2a}$). Signal controller 5 senses a touch on position $F_{1a}$, $F_{1b}$, $F_{2a}$ or $F_{2b}$ by evaluating the phase difference ($\theta_{base}-\theta_{1b}$), the phase difference ($\theta_{base}-\theta_{1a}$), the phase difference ($\theta_{base}-\theta_{2b}$), or the phase difference ($\theta_{base}-\theta_{2a}$), respectively, and by finding only one input interdigital transducer 12 supplied with the electric signal via switch 6 just when the electric signal $E_{1b}$, $E_{1a}$, $E_{2b}$ or $E_{2a}$ is detected at the output point connecting the output terminals of four output interdigital transducers 13. The touched position $F_{1a}$, $F_{1b}$, $F_{2a}$ or $F_{2b}$ with respect to ultrasonic transducing unit X and that with respect to ultrasonic transducing unit Y are specified at the same time.

In the ultrasonic touch-position sensing device of the present invention, it is possible that input interdigital transducer 2, finger-overlap zones $A_1$ and $A_2$ of input interdigital transducer 12, and reference input interdigital transducer 7 have an interdigital periodicity P of 400 $\mu$m, respectively. As mentioned above, zones $R_{1a}$ and $R_{1b}$ of output interdigital transducers 3, zones $R_{1a}$, $R_{1b}$, $R_{2a}$ and $R_{2b}$ of output interdigital transducer 11, finger-overlap zones $C_1$, $C_2$ and $C_3$ of output interdigital transducer 13, and reference output interdigital transducer 8 have an interdigital periodicity equal to the interdigital periodicity P. Under this condition, if an electric signal is applied to each of the input interdigital transducers, a surface acoustic wave is excited on the upper end surface of piezoelectric substrate 1. Therefore, a touched position on the upper end surface of piezoelectric substrate 1 is clarified in such a device.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An ultrasonic touch-position sensing device comprising:

a piezoelectric substrate having an upper- and a lower end surfaces running perpendicular to the direction of the thickness d thereof;

two ultrasonic transducing units, each thereof consisting of at least an input interdigital transducer formed on said upper end surface of said piezoelectric substrate and having an interdigital periodicity P and an overlap length L, and at least an output interdigital transducer opposed to said input interdigital transducer and placed on said upper end surface of said piezoelectric substrate, said output interdigital transducer having a finger-overlap zone $R_i$ (i=1), or having N finger-overlap zones $R_i$ (i=1, 2, . . ., N) and N−1 finger-overlap zones $Q_i$ {i=1, 2, . . . , (N−1)} between two finger-overlap zones $R_i$ and $R_{(i+1)}$, each finger-overlap zone $R_i$ comprising a first zone $R_{ia}$, a second zone $R_{ib}$, and a third zone $R_{im}$ between said zones $R_{ia}$ and $R_{ib}$, the finger direction of said zones $R_{ia}$ and $R_{ib}$, running parallel with that of said input interdigital transducer, an interdigital periodicity of said zones $R_{ia}$ and $R_{ib}$, being equal to said interdigital periodicity P, the finger direction of said zone $R_{im}$ being slanting to that of said input interdigital transducer by an angle $\alpha$, an interdigital periodicity PRN along the vertical direction to the finger direction of said zone $R_{im}$ being equal to the product of said interdigital periodicity P and cos $\alpha$, said zone $R_{im}$ having a first overlap length $L_{RP}$ along the finger direction thereof and a second overlap length $L_{RN}$ along the finger direction of said input interdigital transducer, said overlap length $L_{RP}$ being equal to the product of said overlap length $L_{RN}$ and sec α as well as the product of half said interdigital periodicity P and cosec α, the finger direction of said finger-overlap zone $Q_i$ being slanting to that of said input interdigital transducer by an angle ±β, an interdigital periodicity $P_{QN}$ along the vertical direction to the finger direction of said finger-overlap zone $Q_i$ being equal to the product of said interdigital periodicity P and cos β, said finger-overlap zone $Q_i$ having a first overlap length $L_{QP}$ along the finger direction thereof and a second overlap length $L_{QN}$ along the finger direction of said input interdigital transducer, said overlap length $L_{QP}$ being equal to the product of said overlap length $L_{QN}$ and sec α; and a signal controller connected with said ultrasonic transducing units, said input interdigital transducer receiving an electric signal and exciting an ultrasound in said piezoelectric substrate, said zones $R_{ia}$ and $R_{ib}$ transducing said ultrasound to electric signals $E_{ia}$ and $E_{ib}$ (i=1, 2, ..., N), respectively, the sum of said electric signals $E_{ia}$ and $E_{ib}$ being zero, said input- and output interdigital transducers forming N pairs of ultrasound propagation lanes $Z_{ia}$ and $Z_{ib}$ (i=1, 2, ..., N), in said piezoelectric substrate, corresponding to said zones $R_{ia}$ and $R_{ib}$, respectively, said ultrasound propagation lanes $Z_{ia}$ and $Z_{ib}$ corresponding to positions $F_{ia}$ and $F_{ib}$ (i=1, 2, ..., N) on said upper- or lower end surface of said piezoelectric substrate, respectively, said output interdigital transducer delivering an electric signal $E_{xb}$ corresponding to an ultrasound propagation lane $Z_{xb}$ only when an ultrasound on an ultrasound propagation lane $Z_{xa}$ attenuates by touching with a finger or others on a position $F_{xa}$, or delivering an electric signal $E_{xa}$ corresponding to said ultrasound propagation lane $Z_{xa}$ only when an ultrasound on said ultrasound propagation lane $Z_{xb}$ attenuates by touching on a position $F_{xb}$, said positions $F_{xa}$ and $F_{xb}$ making a pair, said signal controller sensing a touch on said position $F_{xa}$ by detecting said electric signal $E_{xb}$, or a touch on said position $F_{xb}$ by detecting said electric signal $E_{xa}$.

2. An ultrasonic touch-position sensing device in claim 1, wherein said overlap length $L_{QP}$ is equal to the product of cosec β and said interdigital periodicity P divided by twice the number N of said finger-overlap zones $R_i$.

3. An ultrasonic touch-position sensing device in claim 1, wherein each of said ultrasonic transducing units further comprises an amplifier, an output terminal of said output interdigital transducer being connected with an input terminal of said input interdigital transducer and that of said signal controller, via said amplifier, said electric signals $E_{ia}$ and $E_{ib}$ having frequencies $f_{ia}$ and $f_{ib}$, respectively, said signal controller sensing a touch on said position $F_{xa}$ by detecting a frequency $F_{xb}$ of said electric signal $E_{xb}$, or a touch on said position $F_{xb}$ by detecting a frequency $F_{xa}$ of said electric signal $E_{xa}$.

4. An ultrasonic touch-position sensing device in claim 1, wherein each of said ultrasonic transducing units further comprising a reference input interdigital transducer, a reference output interdigital transducer, an amplifier, and a phase comparator, the finger direction of said reference input interdigital transducer being parallel to that of said reference output interdigital transducer, an output terminal of said reference output interdigital transducer being connected not only with an input terminal of said input interdigital transducer and that of said reference input interdigital transducer, but also with an input terminal of said phase comparator, via said amplifier, an output terminal of said output interdigital transducer being connected with an input terminal of said signal controller via said phase comparator, said reference input interdigital transducer receiving an electric signal and exciting an ultrasound in said piezoelectric substrate, said reference output interdigital transducer transducing said ultrasound to an electric signal with a phase $\theta_{base}$, and delivering said electric signal, said electric signals $E_i a$ and $E_{ib}$ having phases $\theta_{ia}$ and $\theta_{ib}$, respectively, said phase comparator detecting a difference between said phases $\theta_{base}$ and $\theta_{ia}$, or a difference between said phases $\theta_{base}$ and $\theta_{ib}$, said signal controller sensing a touch on said position $F_{xa}$ by evaluating a difference between said phase $\theta_{base}$ and a phase $\theta_{xb}$ of said electric signal $E_{xb}$, or a touch on said position $F_{xb}$ by evaluating a difference between said phase $\theta_{base}$ and a phase $\theta_{xa}$ of said electric signal $E_{xa}$.

5. An ultrasonic touch-position sensing device in claim 1, wherein said interdigital periodicity P is larger than said thickness d of said piezoelectric substrate, said input interdigital transducer receiving an electric signal with a frequency approximately corresponding to said interdigital periodicity P and exciting an elastic wave having the wavelength approximately equal to said interdigital periodicity P in said piezoelectric substrate.

6. An ultrasonic touch-position sensing device in claim 1, wherein said interdigital periodicity P is smaller than one third of said thickness d of said piezoelectric substrate, said input interdigital transducer receiving an electric signal with a frequency approximately corresponding to said interdigital periodicity P and exciting a surface acoustic wave having the wavelength approximately equal to said interdigital periodicity P on said upper end surface of said piezoelectric substrate.

7. An ultrasonic touch-position sensing device in claim 1, wherein said piezoelectric substrate is made of a piezoelectric ceramic, the polarization axis thereof being parallel to the direction of said thickness d.

8. An ultrasonic touch-position sensing device in claim 1, wherein said ultrasound propagation lanes $Z_{ia}$ and $Z_{ib}$, of one of said ultrasonic transducing units, are vertical to said ultrasound propagation lanes $Z_{ia}$ and $Z_{ib}$, of the other of said ultrasonic transducing units.

9. An ultrasonic touch-position sensing device comprising:

a piezoelectric substrate having an upper- and a lower end surfaces running perpendicular to the direction of the thickness d thereof;

two ultrasonic transducing units, each thereof consisting of at least an input interdigital transducer formed on said upper end surface of said piezoelectric substrate and having N finger-overlap zones $A_i$ (i=1, 2, ..., N) and N−1 finger-overlap zones $B_i$ {i=1, 2, ..., (N−1)} between two finger-overlap zones $A_i$ and $A_{(i+1)}$, and at least an output interdigital transducer opposed to said input interdigital transducer and placed on said upper end surface of said piezoelectric substrate, said output interdigital transducer having N+1 finger-overlap zones $C_i$ {i=1, 2, ..., (N+1)} and N finger-overlap zones $D_i$ (i=1, 2, ..., N) between two finger-overlap zones $C_i$ and $C_{(i+1)}$, the finger direction of said finger-overlap zones $A_i$ running parallel with that of said finger-overlap zones $C_i$, the finger direction of said finger-overlap zones $B_i$ being slanting to that of said finger-overlap zones $A_i$ by an angle $-\beta$, an interdigital periodicity $P_{BN}$ along the vertical direction to the finger direction of said finger-overlap zones $B_i$ being equal to the product of $\cos \beta$ and an interdigital periodicity P of said finger-overlap zones $A_i$ and $C_i$, each finger-overlap zone $B_i$ having a first overlap length $L_{BP}$ along the finger direction thereof and a second overlap length $L_{BN}$ along the finger direction of said finger-overlap zones $A_i$, said overlap length $L_{BP}$ being equal to the product of $\sec \beta$ and said overlap length $L_{BN}$, the finger direction of said finger-overlap zones $D_i$ being slanting to that of said finger-overlap zones $C_i$ by an angle $\alpha$, an interdigital periodicity $P_{DN}$ along the vertical direction to the finger direction of said finger-overlap zones $D_i$ being equal to the product of $\cos \alpha$ and said interdigital periodicity P, each finger-overlap zone $D_i$ having a first overlap length $L_{DP}$ along the finger direction thereof and a second overlap length $L_{DN}$ along the finger direction of said finger-overlap zones $C_i$, said overlap length $L_{DP}$ being equal to the product of $\sec \alpha$ and said overlap length $L_{DN}$ as well as the product of half said interdigital periodicity P and $\operatorname{cosec} \alpha$; and a signal controller connected with said ultrasonic transducing units, said input interdigital transducer receiving an electric signal and exciting an ultrasound in said piezoelectric substrate, said output interdigital transducer transducing said ultrasound to N electric signals $E_{ia}$ (i=1, 2, ..., N) and N electric signals $E_{ib}$ (i=1, 2, ..., N), respectively, the sum of said electric signals $E_{ia}$ and $E_{ib}$ being zero, said input- and output interdigital transducers forming N pairs of ultrasound propagation lanes $Z_{ia}$ and $Z_{ib}$ (i=1, 2, ..., N) in said piezoelectric substrate, an ultrasound propagation lane $Z_{ia}$ existing between said finger-overlap zones $A_i$ and $C_i$, an ultrasound propagation lane $Z_{ib}$ existing between said finger-overlap zones $A_i$ and $C_{(i+1)}$, said ultrasound propagation lanes $Z_{ia}$ and $Z_{ib}$ corresponding to positions $F_{ia}$ and $F_{ib}$ (i=1, 2, ..., N) on said upper- or lower end surface of said piezoelectric substrate, respectively, said output interdigital transducer delivering an electric signal $E_{xb}$ corresponding to an ultrasound propagation lane $Z_{xb}$ only when an ultrasound on an ultrasound propagation lane $Z_{xa}$ attenuates by touching with a finger or others on a position $F_{xa}$, or delivering an electric signal $E_{xa}$ corresponding to said ultrasound propagation lane $Z_{xa}$ only when an ultrasound on said ultrasound propagation lane $Z_{xb}$ attenuates by touching on a position $F_{xb}$, said positions $F_{xa}$ and $F_{xb}$ making a pair, said signal controller sensing a touch on said position $F_{xa}$ by detecting said electric signal $E_{xb}$, or a touch on said position $F_{xb}$ by detecting said electric signal $E_{xa}$.

10. An ultrasonic touch-position sensing device in claim 9, wherein said overlap length $L_{BP}$ is equal to the product of $\operatorname{cosec} \beta$ and said interdigital periodicity P divided by twice the number N of said finger-overlap zones $A_i$.

11. An ultrasonic touch-position sensing device in claim 9, wherein each of said ultrasonic transducing units further comprises an amplifier, an output terminal of said output interdigital transducer being connected with an input terminal of said input interdigital transducer and that of said signal controller, via said amplifier, said electric signals $E_{ia}$ and $E_{ib}$ having frequencies $f_{ia}$ and $f_{ib}$, respectively, said signal controller sensing a touch on said position $F_{xa}$ by detecting a frequency $F_{xb}$ of said electric signal $E_{xb}$, or a touch on said position $F_{xb}$ by detecting a frequency $F_{xa}$ of said electric signal $E_{xa}$.

12. An ultrasonic touch-position sensing device in claim 9, wherein each of said ultrasonic transducing units further comprising a reference input interdigital transducer, a reference output interdigital transducer, an amplifier, and a phase comparator, the finger direction of said reference input interdigital transducer being parallel to that of said reference output interdigital transducer, an output terminal of said reference output interdigital transducer being connected not only with an input terminal of said input interdigital transducer and that of said reference input interdigital transducer, but also with an input terminal of said phase comparator, via said amplifier, an output terminal of said output interdigital transducer being connected with an input terminal of said signal controller via said phase comparator, said reference input interdigital transducer receiving an electric signal and exciting an ultrasound in said piezoelectric substrate, said reference output interdigital transducer transducing said ultrasound to an electric signal with a phase $\theta_{base}$, and delivering said electric signal, said electric signals $E_{ia}$ and $E_{ib}$ having phases $\theta_{ia}$ and $\theta_{ib}$, respectively, said phase comparator detecting a difference between said phases $\theta_{base}$ and $\theta_{ia}$, or a difference between said phases $\theta_{base}$ and $\theta_{ib}$, said signal controller sensing a touch on said position $F_{xa}$ by evaluating a difference between said phase $\theta_{base}$ and a phase $\theta_{xb}$ of said electric signal $E_{xb}$, or a touch on said position $F_{xb}$ by evaluating a difference between said phase $\theta_{base}$ and a phase $\theta_{xa}$ of said electric signal $E_{xa}$.

13. An ultrasonic touch-position sensing device in claim 9, wherein said interdigital periodicity P is larger than said thickness d of said piezoelectric substrate, said input interdigital transducer receiving an electric signal with a frequency approximately corresponding to said interdigital periodicity P and exciting an elastic wave having the wavelength approximately equal to said interdigital periodicity P in said piezoelectric substrate.

14. An ultrasonic touch-position sensing device in claim 9, wherein said interdigital periodicity P is smaller than one third of said thickness d of said piezoelectric substrate, said input interdigital transducer receiving an electric signal with a frequency approximately corresponding to said interdigital periodicity P and exciting a surface acoustic wave having the wavelength approximately equal to said interdigital periodicity P on said upper end surface of said piezoelectric substrate.

15. An ultrasonic touch-position sensing device in claim 9, wherein said piezoelectric substrate is made of a piezoelectric ceramic, the polarization axis thereof being parallel to the direction of said thickness d.

16. An ultrasonic touch-position sensing device in claim 9, wherein said ultrasound propagation lanes $Z_{ia}$ and $Z_{ib}$, of one of said ultrasonic transducing units, are vertical to said ultrasound propagation lanes $Z_{ia}$ and $Z_{ib}$, of the other of said ultrasonic transducing units.

\* \* \* \* \*